United States Patent
Tanemura et al.

(10) Patent No.: US 8,411,281 B2
(45) Date of Patent: Apr. 2, 2013

(54) FABRY-PEROT INTERFEROMETER HAVING AN INCREASED SPECTRAL BAND

(75) Inventors: Tomoki Tanemura, Nisshin (JP); Yukihiro Takeuchi, Miyoshi (JP); Takao Iwaki, Miyoshi (JP); Megumi Suzuki, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/301,988

(22) Filed: Nov. 22, 2011

(65) Prior Publication Data
US 2012/0127482 A1    May 24, 2012

(30) Foreign Application Priority Data

Nov. 24, 2010  (JP) .................................. 2010-261490

(51) Int. Cl.
    *G01B 9/02* (2006.01)
(52) U.S. Cl. .......................... 356/519; 356/454; 356/260
(58) Field of Classification Search .................. 356/454, 356/506, 519; 359/260; 200/181
    See application file for complete search history.

(56) References Cited

U.S. PATENT DOCUMENTS

| | | | |
|---|---|---|---|
| 5,646,729 A | 7/1997 | Koskinen et al. | |
| 5,825,490 A * | 10/1998 | Haas et al. | 356/519 |
| 7,190,523 B2 * | 3/2007 | Yoda | 359/579 |
| 7,733,495 B2 | 6/2010 | Suzuki et al. | |
| 2002/0141036 A1 * | 10/2002 | Jin et al. | 359/291 |
| 2004/0100678 A1 | 5/2004 | Chang et al. | |
| 2005/0001275 A1 | 1/2005 | Sugiura et al. | |
| 2005/0146241 A1 * | 7/2005 | Wan | 310/309 |
| 2006/0245034 A1 * | 11/2006 | Chen et al. | 359/291 |
| 2008/0123100 A1 | 5/2008 | Suzuki et al. | |
| 2008/0135385 A1 | 6/2008 | Steeneken et al. | |
| 2011/0019202 A1 * | 1/2011 | Iwaki et al. | 356/519 |

FOREIGN PATENT DOCUMENTS

| | | |
|---|---|---|
| EP | 1 093 142 A2 | 4/2001 |
| JP | A-2001-179699 | 7/2001 |
| JP | A-2004-226362 | 8/2004 |
| JP | B2-3744885 | 12/2005 |
| JP | A-2006-319779 | 11/2006 |
| JP | A-2010-8644 | 1/2010 |

* cited by examiner

*Primary Examiner* — Tarifur Chowdhury
*Assistant Examiner* — Michael P Lapage
(74) *Attorney, Agent, or Firm* — Posz Law Group, PLC

(57) ABSTRACT

A Fabry-Perot interferometer includes a fixed mirror structure and a movable mirror structure. The fixed mirror structure has a fixed mirror in a spectral region. The movable mirror structure includes a membrane spaced from the fixed mirror structure. The membrane has a movable mirror in the spectral region and multiple springs arranged one inside the other around the spectral region. A spring constant of the inner spring is less than a spring constant of the outer spring. One of the fixed mirror structure and the membrane has multiple electrodes, and the other of the fixed mirror structure and the membrane has at least one electrode that is paired with the electrodes to form opposing electrode pairs arranged one inside the other around the spectral region. The number of the opposing electrode pairs is equal to the number of the springs.

20 Claims, 13 Drawing Sheets

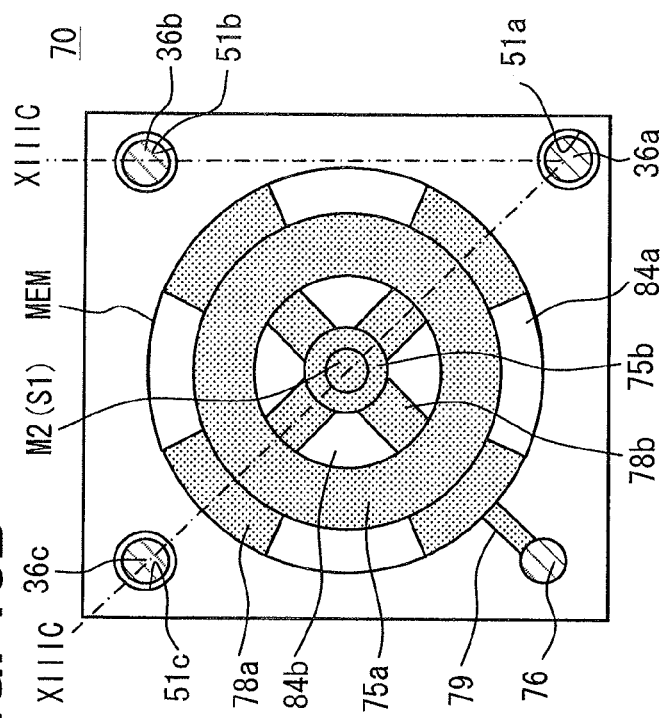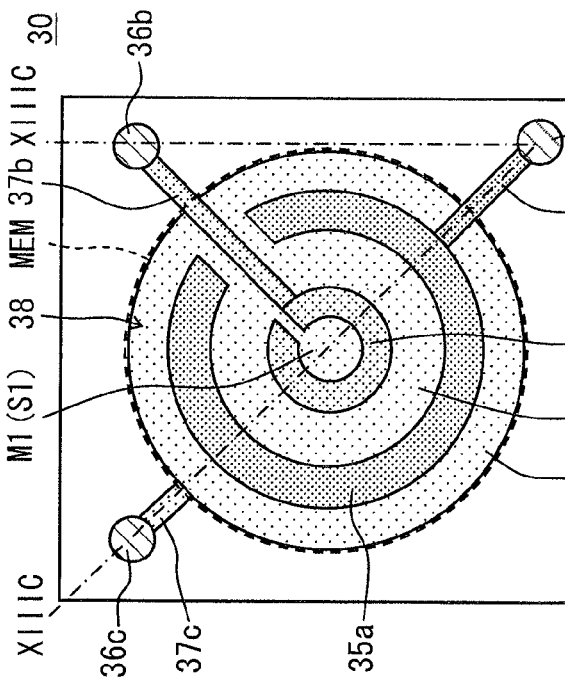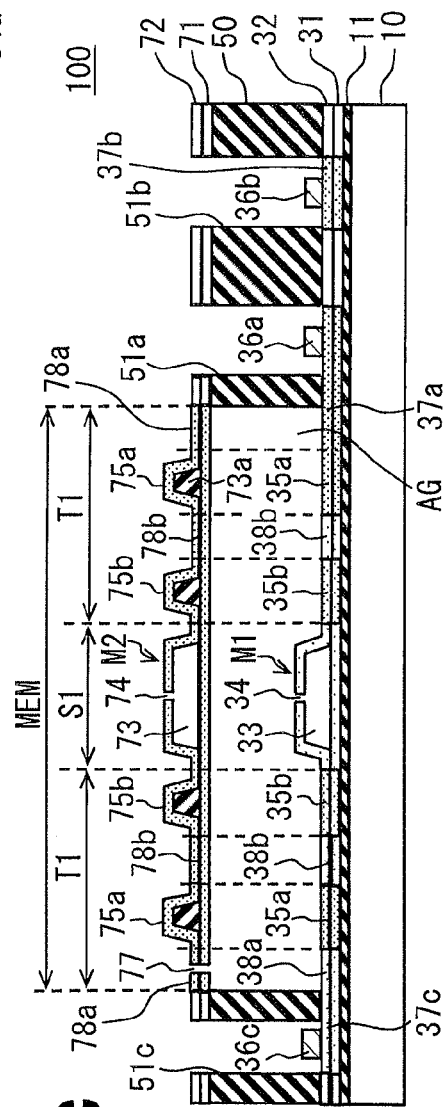
FIG. 13A
FIG. 13B
FIG. 13C

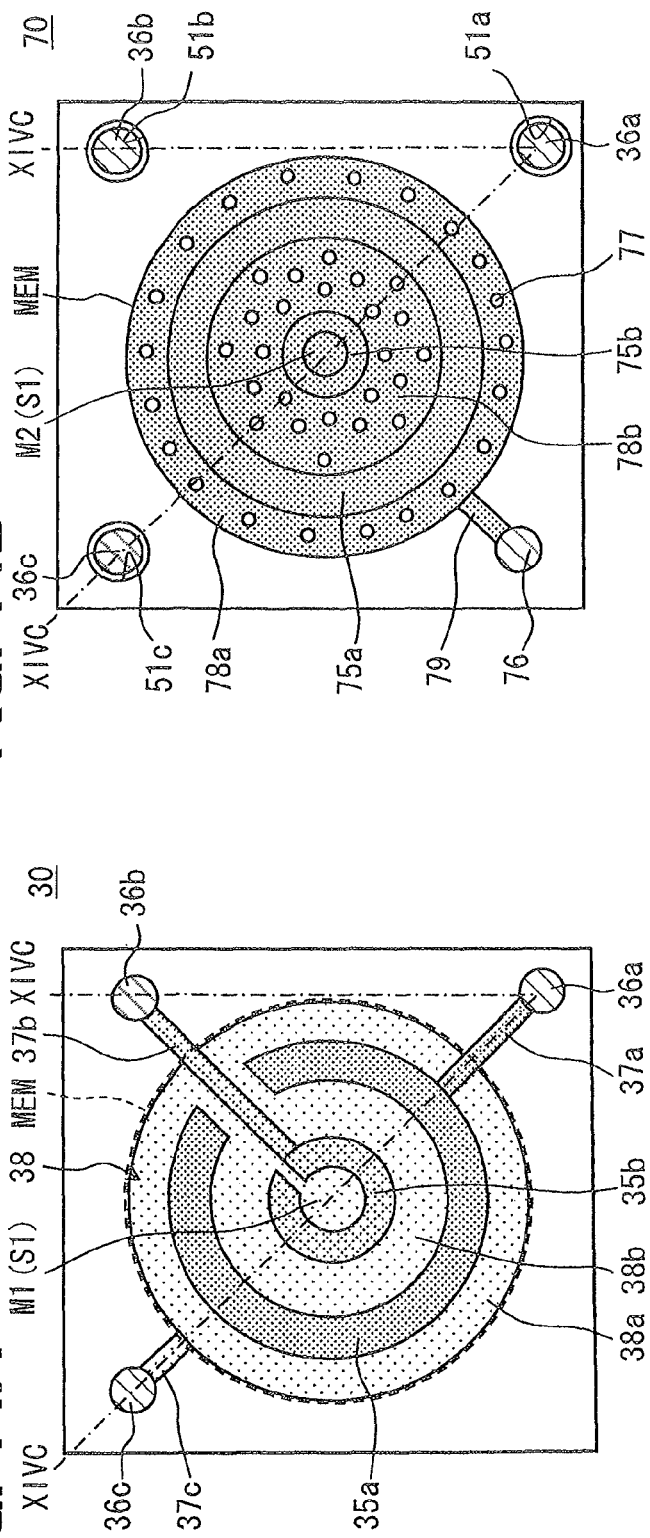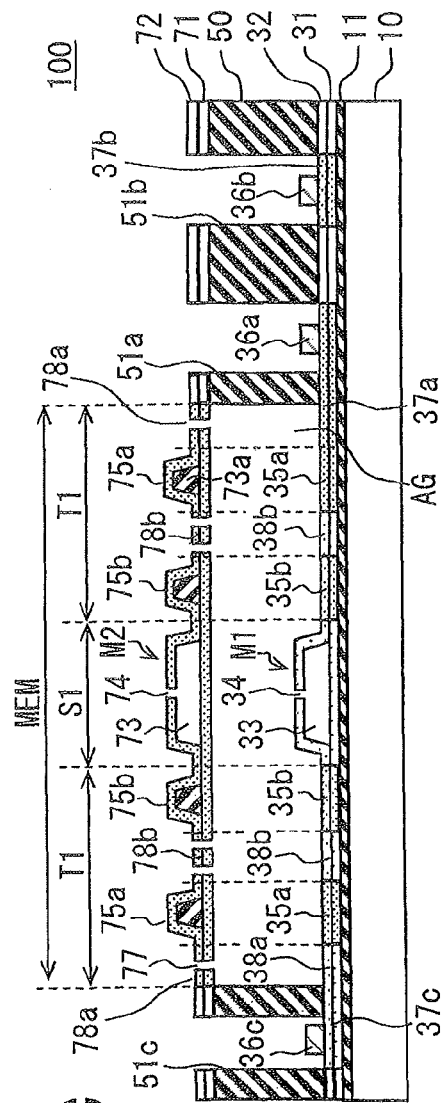

FABRY-PEROT INTERFEROMETER HAVING AN INCREASED SPECTRAL BAND

CROSS REFERENCE TO RELATED APPLICATION

This application is based on and incorporates herein by reference Japanese Patent Application No. 2010-261490 filed on Nov. 24, 2010.

FIELD

The present invention relates to a Fabry-Perot interferometer.

BACKGROUND

A Fabry-Perot interferometer has been disclosed in U.S. Pat. No. 5,646,729 corresponding to JP 3457373 and U.S. Pat. No. 7,733,495 corresponding to JP-A-2008-134388. The Fabry-Perot interferometer has a pair of mirrors. Each mirror includes high refractive layers and a low refractive layer sandwiched between the high refractive layers. The high refractive layer is made of a semiconductor material such as silicon or germanium. The low refractive layer is made of such as air, silicon oxide, or silicon nitride. One mirror is configured as a fixed mirror, and the other mirror is configured as a movable mirror. In U.S. Pat. No. 5,646,729, the low refractive layer is a silicon dioxide layer. In U.S. Pat. No. 7,733,495, the low refractive layer is an air layer.

Impurities are doped into the high refractive layer to form an electrode. A voltage is applied between the electrodes of the mirrors so that the movable mirror can be displaced by an electrostatic force. Thus, a distance between the mirrors is adjusted to selectively transmits light of a predetermined wavelength corresponding to the distance.

A spectral band of the conventional Fabry-Perot interferometer may be increased by increasing the amount of displacement of the movable mirror.

As is well known, the electrostatic force generated upon application of the voltage to the electrodes of the mirrors is inversely proportional to the square of the distance between the electrodes. In contrast, the restoring force of the movable mirror is proportional to a change in the distance between the electrodes. In the conventional Fabry-Perot interferometer disclosed in U.S. Pat. No. 5,646,729 and U.S. Pat. No. 7,733,495, when the change in the distance exceeds one-third of the initial distance (i.e., the amount of displacement of the movable mirror exceeds one-third of the initial distance), the electrostatic force exceeds the restoring force so that the movable mirror can stick to the fixed mirror. This phenomenon is known as a pull-in. Once a pull-in occurs, the movable mirror cannot return to its original position even after the voltage is removed. Therefore, it is difficult to increase the spectral band of the conventional Fabry-Perot interferometer by increasing the amount of displacement of the movable mirror.

JP-A-2010-8644 and JP-A-2008-517784 corresponding to US 2008/0135385 disclose a technique for preventing the pull-in. The technique disclosed in JP-A-2010-8644 and US 2008/0135385 may be applied to the conventional Fabry-Perot interferometer disclosed in U.S. Pat. No. 5,646,729 and U.S. Pat. No. 7,733,495 to prevent the pull-in. However, even if the technique is applied to the conventional Fabry-Perot interferometer, the amount of displacement of the movable mirror cannot exceed one-third of the initial distance. Therefore, the spectral band cannot be increased.

SUMMARY

In view of the above, it is an object of the present invention is to provide a Fabry-Perot interferometer having an increased spectral band.

According to an aspect of the present invention, a Fabry-Perot interferometer includes a fixed mirror structure having a fixed mirror in a spectral region and a movable mirror structure including a movable membrane oppositely spaced from the fixed mirror structure. The membrane has a movable mirror in the spectral region. The membrane has multiple springs in a peripheral region outside the spectral region. The springs are arranged one inside the other around the spectral region. One of the fixed mirror structure and the membrane has multiple first electrodes in the peripheral region. The other of the fixed mirror structure and the membrane has at least one second electrode in the peripheral region. The first electrodes and the at least one second electrode are located opposite to each other to form multiple opposing electrode pairs arranged one inside the other around the spectral region. The number of the springs is equal to the number of the opposing electrode pairs. The springs have a first spring and a second spring located closer to the center of the membrane than the first spring in a direction from an outer edge of the membrane to the center of the membrane. A spring constant of the second spring is less than a spring constant of the first spring. The opposing electrode pairs have a first electrode pair and a second electrode pair. A first voltage is applied to the first electrode pair during a first period to generate a first electrostatic force. A second voltage is applied to the second electrode pair during a second period to generate a second electrostatic force. The first period overlaps the second period so that the membrane is displaced during the overlapping period by both the first electrostatic force and the second electrostatic force.

BRIEF DESCRIPTION OF THE DRAWINGS

The above and other objectives, features and advantages of the present invention will become more apparent from the following detailed description made with check to the accompanying drawings. In the drawings:

FIG. 13A is a diagram illustrating a plan view of a fixed mirror structure of a Fabry-Perot interferometer according to a third embodiment of the present invention, FIG. 13B is a diagram illustrating a plan view of a movable mirror structure of the Fabry-Perot interferometer according to the third embodiment, and FIG. 13C is a diagram illustrating a cross-sectional view of the Fabry-Perot interferometer according to the third embodiment taken along the line XIIIC-XIIIC in FIGS. 13A and 13B;

FIG. 14A is a diagram illustrating a plan view of a fixed mirror structure of a Fabry-Perot interferometer according to a fourth embodiment of the present invention, FIG. 14B is a diagram illustrating a plan view of a movable mirror structure of the Fabry-Perot interferometer according to the fourth embodiment, and FIG. 14C is a diagram illustrating a cross-sectional view of the Fabry-Perot interferometer according to the fourth embodiment taken along the line XIVC-XIVC in FIGS. 14A and 14B;

DETAILED DESCRIPTION OF THE PREFERRED EMBODIMENTS

Embodiments of the present invention are described below with reference to the drawings. Throughout the embodiments, a spectral region S1 of a Fabry-Perot interferometer is defined as a region where a fixed mirror M1 and a movable mirror M2 are located opposite to each other. A peripheral region T1 of the Fabry-Perot interferometer is defined as a region corresponding to a membrane MEM of a movable mirror structure 70 outside the spectral region S1.

First of all, the story behind the present invention is described.

Figure 1:
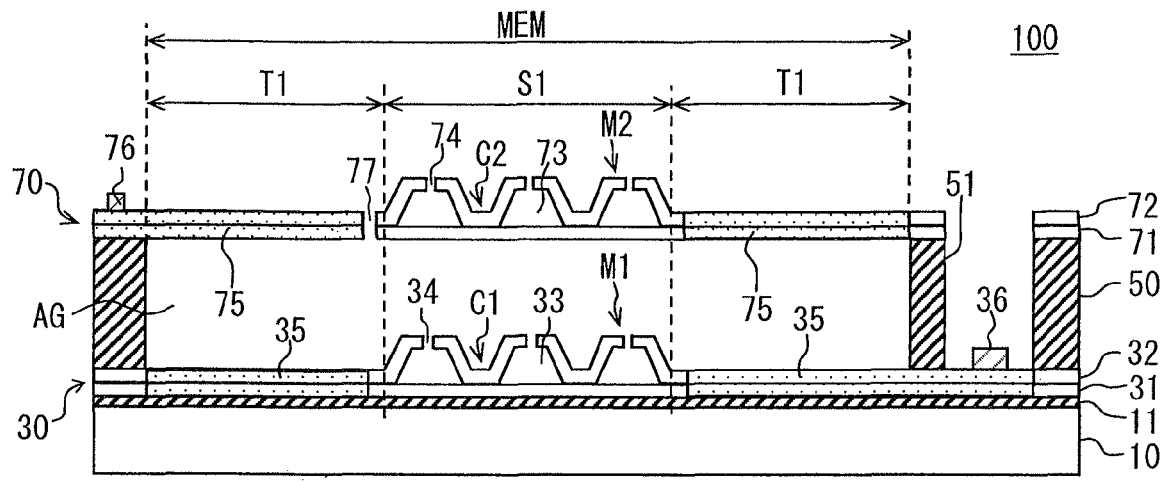
FIG. 1 is a diagram illustrating a cross-sectional view of a conventional Fabry-Perot interferometer.

FIG. 1 is a diagram illustrating a conventional Fabry-Perot interferometer 100 disclosed in U.S. Pat. No. 7,733,495, the contents of which are herein incorporated by reference.

The Fabry-Perot interferometer 100 is fabricated by MEMS processes. The Fabry-Perot interferometer 100 includes a substrate 10, a fixed mirror structure 30, and a movable mirror structure 70. The fixed mirror structure 30 is located on the substrate 10. The movable mirror structure 70 is supported above the fixed mirror structure 30 by a supporting member 50 so that an air gap AG can be formed between the fixed mirror structure 30 and the movable mirror structure 70. The fixed mirror structure 30 has a fixed mirror M1 in a spectral region S1. A movable mirror structure 70 has a movable mirror M2 in the spectral region S1. A portion of the movable mirror structure 70 crossing over the air gap AG is configured as a movable membrane MEM. The membrane MEM of the movable mirror structure 70 is displaced by an electrostatic force that is generated based on a voltage applied between an electrode 35 of the fixed mirror structure 30 and an electrode 75 of the movable mirror structure 70. The air gap AG changes with displacement of the membrane MEM so that a distance between the fixed mirror M1 and the movable mirror M2 can change with displacement of the membrane MEM. Thus, the Fabry-Perot interferometer 100 selectively transmits light of a predetermined wavelength corresponding to the distance between the fixed mirror M1 and the movable mirror M2.

The fixed mirror structure 30 includes a high refractive bottom layer 31 and a high refractive top layer 32. The high refractive bottom layer 31 is located on the substrate 10 through an insulation layer 11. The high refractive top layer 32 is located on the high refractive bottom layer 31. For example, each of the high refractive bottom layer 31 and the high refractive top layer 32 is made of poly-silicon. An air layer 33, as a low refractive layer, is interposed between the high refractive bottom layer 31 and the high refractive top layer 32 in the spectral region S1 to form the fixed mirror M1. In the spectral region S1, the high refractive top layer 32 is partially joined to the high refractive bottom layer 31 at joint portions C1 so that the fixed mirror M1 can be divided in multiple fixed mirror portions. In a region outside the spectral region S1, the high refractive top layer 32 is in contact with the high refractive bottom layer 31 to form a stacked layer. The electrode 35 is formed in the stacked layer in a peripheral region T1 corresponding to the membrane MEM outside the spectral region S1. The air layer 33 is formed by etching using a through hole 34.

The movable mirror structure 70 includes a high refractive bottom layer 71 and a high refractive top layer 72. The high refractive bottom layer 71 is supported by the supporting member 50 over the air gap AG. The high refractive top layer 72 is located on the high refractive bottom layer 71. For example, each of the high refractive bottom layer 71 and the high refractive top layer 72 is made of poly-silicon. An air layer 73, as a low refractive layer, is interposed between the high refractive bottom layer 71 and the high refractive top layer 72 in the spectral region S1 to form the movable mirror M2. The fixed mirror M1 and the movable mirror M2 are oppositely located to each other in the spectral region S1. In the spectral region S1, the high refractive top layer 72 is partially joined to the high refractive bottom layer 71 at joint portions C2 so that the movable mirror M2 can be divided in multiple movable mirror portions. In the region outside the spectral region S1, the high refractive top layer 72 is in contact with the high refractive bottom layer 71 to form a stacked layer. The electrode 75 is formed in the stacked layer in the peripheral region T1. The air layer 73 is formed by etching using a through hole 74.

A contact hole 51 is formed in the supporting member 50. The contact hole 51 reaches the high refractive top layer 32. A pad 36 is formed on the electrode 35 in the contact hole 51. A pad 76 is formed on the electrode 75. The air gap AG communicates with outside through a through hole 77 in the membrane MEM. In the Fabry-Perot interferometer 100 shown in FIG. 1, the membrane MEM as a whole is displaced by the electrostatic force.

Figure 2:
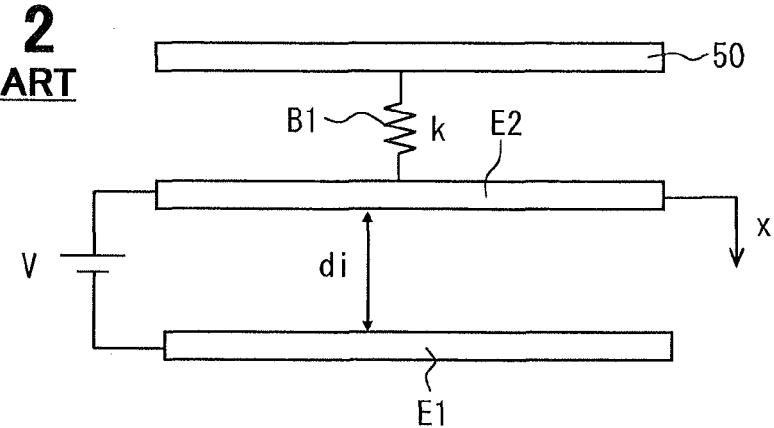
FIG. 2 is a diagram illustrating a simplified model of the conventional Fabry-Perot interferometer.

FIG. 2 is a simplified model of the Fabry-Perot interferometer 100 shown in FIG. 1. As shown in FIG. 2, the Fabry-Perot interferometer 100 includes a spring B1 and a pair of opposing electrodes E1, E2. The electrode E2 is connected to the supporting member 50 by the spring B1. Thus, the electrode E1 is fixed, and the electrode E2 is movable. The electrode E1 corresponds to the electrode 35 in FIG. 1. The electrode E2 and the spring B1 correspond to the electrode 75 in FIG. 1.

In the description below, k is a spring constant of the spring B1, V is a voltage applied to the pair of opposing electrodes E1, E2, di is an initial distance (i.e., distance when no voltage is applied) between the electrodes E1, E2, x is an absolute displacement by which the electrode E2 is displaced upon application of the voltage V, ∈ is a dielectric constant in the atmosphere, and S is an overlapping area of the electrodes E1, E2.

A restoring force F1 of the spring B1 and an electrostatic force F2 generated when the electrode E2 is displaced by the displacement x upon application of the voltage V to the pair of opposing electrodes E1, E2 are given as follows:

$$F1=f(x)=kx \tag{1}$$

$$F2=g(x)=\in SV^2/\{2(di-x)^2\} \tag{2}$$

Figure 3:
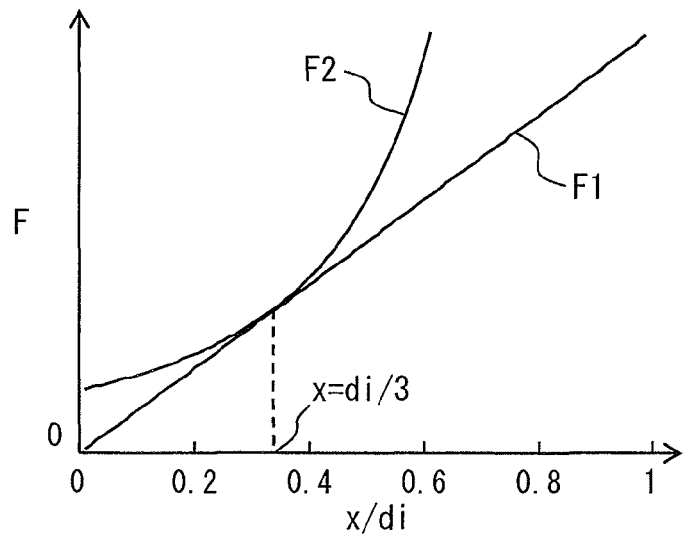
FIG. 3 is a diagram illustrating a pull-in threshold of the simplified model.

A pull-in occurs when graphs of the restoring force F1 and the electrostatic force F2 are tangent as shown in FIG. 3. A pull-in threshold, which is the maximum displacement of the electrode E2 without the pull-in, is calculated as follows:

$$F1=F2 \therefore kx=\in SV^2\{/2(di-x)^2\} \tag{3}$$

$$F1'=F2' \therefore k=\in SV^2/(di-x)^3 \tag{4}$$

From the equations (3), (4), the pull-in threshold x is given as follows:

$$x=di/3 \tag{5}$$

As described above, according to the conventional Fabry-Perot interferometer 100, when the electrode E2 is displaced by more than di/3, the electrostatic force F2 exceeds the restoring force F1 so that the electrode E2 can stick to the electrode E1. That is, when the electrode E2 is displaced by more than di/3, the pull-in can occur. Therefore, it is difficult to increase a spectral band of the conventional Fabry-Perot interferometer 100 by increasing the amount of displacement of the membrane MEM.

The embodiments described below are based on the above study.

First Embodiment

Figure 4:
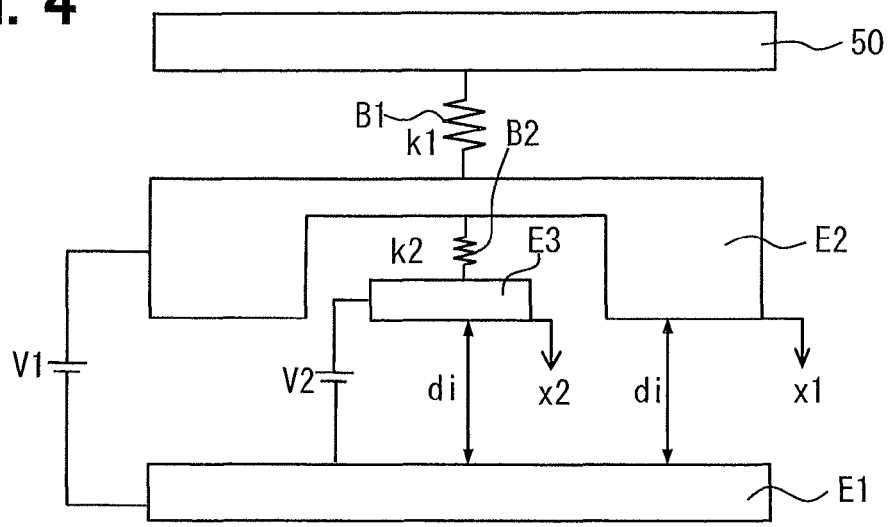
FIG. 4 is a diagram illustrating a simplified model of a Fabry-Perot interferometer according to a first embodiment of the present invention.

FIG. 4 is a diagram illustrating a simplified model of a Fabry-Perot interferometer 100 according to a first embodiment of the present invention. As shown in FIG. 4, the Fabry-Perot interferometer 100 includes a spring B1, a spring B2, an electrode E1, an electrode E2, and an electrode E3. The electrodes E1, E2 are located opposite to each other to form a first electrode pair. The electrode E2 is connected to a supporting member 50 by the spring B1 so that the electrode E2 can be moved (i.e., displaced). The electrodes E1, E3 are located opposite to each other to form a second electrode pair. The electrode E3 is connected to the electrode E2 by the spring B2 so that the electrode E3 can be moved (i.e., displaced). That is, the Fabry-Perot interferometer 100 has two springs and two electrode pairs. Whereas the electrode E1 is fixed, the electrodes E2, E3 are movable.

In the description below, k1 is a spring constant of the spring B1, k2 is a spring constant of the spring B2, V1 is a voltage applied between the electrodes E1, E2, V2 is a voltage applied between the electrodes E1, E3, di is an initial distance (i.e., distance when no voltage is applied) between the electrodes E1, E2 and an initial distance between the electrodes E1, E3, x1 is an absolute displacement by which the electrode E2 is displaced upon application of the voltages V1, V2, x2 is an absolute displacement by which the electrode E3 is displaced upon application of the voltages V1, V2, ∈ is a dielectric constant in the atmosphere, S1 is an overlapping area of the electrodes E1, E2, and S2 is an overlapping area of the electrodes E1, E3.

A balance of force on the electrode E2 is given by the following equation:

$$k1x1=k2(x2-x1)+\in S1V1^2/\{2(di-x1)^2\} \tag{6}$$

The left hand of the equation (6) represents a restoring force of the spring B1. The right hand of the equation (6) represents an electrostatic force generated upon application of the voltage V1.

Likewise, a balance of force on the electrode E3 is given by the following equation:

$$k2(x2-1)=\in S2V2^2/\{2(di-x2)^{2}\} \tag{7}$$

The pull-in threshold can be calculated from the equation (6), (7) in the same manner as described above.

Figure 5:
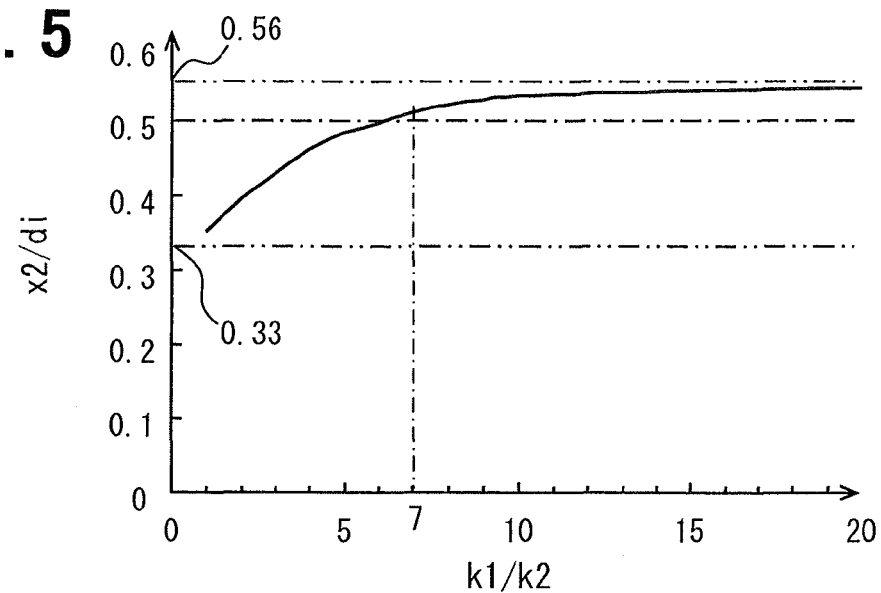
FIG. 5 is a diagram illustrating a relationship between the maximum value of an electrode displacement and a spring constant ratio of the simplified model.

FIG. 5 is a diagram illustrating a relationship between the maximum value of the displacement x2 of the electrode E3 and the spring constant ratio k1/k2. As can be seen from FIG. 5, when the spring constant ratio k1/k2 is larger than 1, the electrode E3 can be displaced by at least di/3 (≈0.33 di) without the pull-in. Assuming that the spring constant ratio k1/k2 is infinity, the electrode E3 can be displaced by up to 5 di/9 (≈0.56 di) without the pull-in. Thus, ideally, the electrode E3 can be displaced by up to 5 di/9 (≈0.56 di) without the pull-in.

Figure 6:
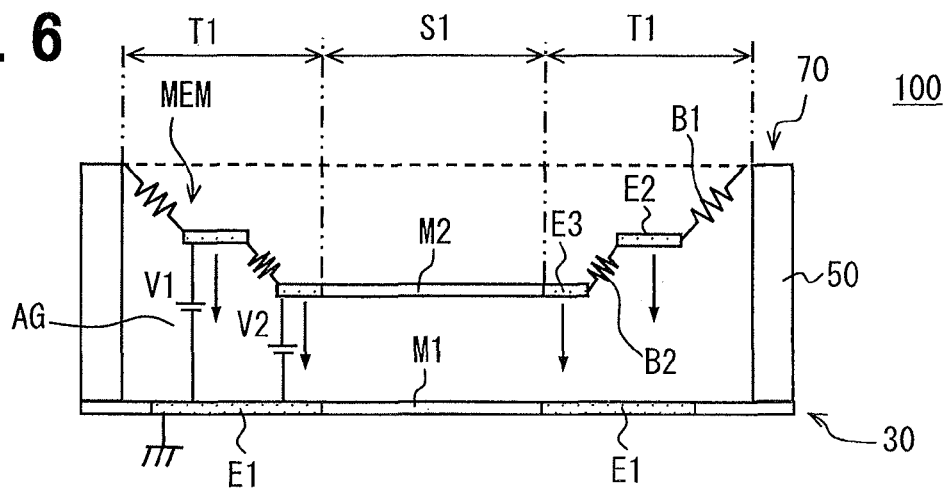
FIG. 6 is a diagram illustrating the Fabry-Perot interferometer according to the first embodiment in which voltages are applied to electrode pairs.

The Fabry-Perot interferometer 100 according to the first embodiment of the present invention is described in detail below with reference to FIG. 6. As shown in FIG. 6, the Fabry-Perot interferometer 100 includes a fixed mirror structure 30 and a movable mirror structure 70. The fixed mirror structure 30 has a fixed mirror M1 in a spectral region S1. The movable mirror structure 70 has a movable mirror M2 in the spectral region S1. A portion of the movable mirror structure 70 is configured as a movable membrane MEM. The membrane MEM includes the movable mirror M2 and is located opposite to the fixed mirror structure 30 across an air gap AG. A portion of the movable mirror structure 70 except the membrane MEM is supported by the supporting member 50. Thus, the movable mirror structure 70 is located above the fixed mirror structure 30 so that the movable mirror M2 of the membrane MEM can be located opposite to the fixed mirror M1.

The membrane MEM has multiple springs. The springs are located in a peripheral region T1 outside a spectral region S1, where the movable mirror M2 is located. That is, the springs are located around the spectral region S1. Specifically, the springs are arranged one inside the other around the spectral region S1 so that the movable mirror M2 can be surrounded with the springs. A spring constant of the spring is smaller as the spring is located closer to the center of the membrane MEM in a direction from an outer edge of the membrane MEM to the center of the membrane MEM. In an example shown in FIG. 6, the springs include a spring B1 and a spring B2. The spring B2 is located closer to the center of the membrane MEM than the spring B1. A spring constant k2 of the spring B2 is smaller than a spring constant k1 of the spring B1.

Further, the membrane MEM and the fixed mirror structure 30 have electrodes in the peripheral region T1. The electrodes of the membrane MEM and the fixed mirror structure 30 are located opposite to each other to form multiple electrode pairs. The electrode pairs are arranged one inside the other around the spectral region S1. The number of the electrode pairs is equal to the number of the springs. The electrode pairs are electrically isolated from each other so that a voltage can be applied to each electrode pair independently. In an example shown in FIG. 6, the membrane MEM of the movable mirror structure 70 has two electrodes E2, E3. The electrodes E2, E3 are arranged one inside the other around the spectral region S1, i.e., the movable mirror M2. Specifically, the spring B1, the electrode E2, the spring B2, the electrode E3, and the movable mirror M2 are arranged in this order in the direction from the outer edge of the membrane MEM to the center of the membrane MEM. The fixed mirror structure 30 has an electrode E1. The electrode E1 is located opposite to the electrodes E2, E3 to form two electrode pairs, i.e., a first electrode pair of electrodes E1, E2, and a second electrode pair of electrodes E2, E3. Thus, the springs and the electrode pairs are alternately arranged in the direction from the outer edge of the membrane MEM to the center of the membrane MEM. The stiffness of each of the electrodes E2, E3 is greater than the stiffness of any one of the springs B1, B2.

When a voltage V1 is applied to the outermost electrode pair of electrodes E1, E2 corresponding to the outermost spring B1, the spring B1 is deformed by an electrostatic force generated in the electrode pair of electrodes E1, E2. Thus, the membrane MEM as a whole is displaced upon application of the voltage V1 to the electrode pair of electrodes E1, E2. In contrast, when a voltage V2 is applied to the electrode pair of electrodes E1, E3 located inside the electrode pair of electrodes E1, E2, the spring B2 is deformed by an electrostatic force generated in the inner electrode pair of electrodes E1, E3. In this case, since the spring constant k1 of the outermost spring B1 is greater than the spring constant K2 of the inner spring B2, the inner spring B2 is deformed with little or no deformation of the outermost spring B1. In view of the spring constant relationship (i.e., k1>k2), the electrostatic force generated in the electrode pair of electrodes E1, E3 upon application of the voltage V2 is set smaller than the electrostatic force generated in the electrode pair of electrodes E1, E2 upon application of the voltage V1.

Therefore, as shown in FIG. 6, when the voltage V2 is applied to the inner electrode pair of electrodes E1, E3 during a period of time when the movable mirror M2 of the membrane MEM is displaced by the electrostatic force generated in the outermost electrode pair of electrodes E1, E2 upon application of the voltage V1 to the outermost electrode pair of electrodes E1, E2, the movable mirror M2 can be further displaced by the electrostatic force generated in the inner electrode pair of electrodes E1, E3 upon application of the voltage V2 to the inner electrode pair of electrodes E1, E3. Ideally, the movable mirror M2 is displaced by di/3 by the electrostatic force generated in the electrode pair of electrodes E1, E2 so that the distance between the fixed mirror M1 and the movable mirror M2 can be 2 di/3, where di is an initial distance (i.e., distance when no voltage is applied) between the fixed mirror M1 and the movable mirror M2. Further, the movable mirror M2 is displaced by (2 di/3)/3 by the electrostatic force generated in the electrode pair of electrodes E1, E3 so that the distance between the fixed mirror M1 and the movable mirror M2 can be 4 di/9 finally. That is, the total displacement of the membrane MEM (i.e., movable mirror M2) is 5 di/9, which is greater than the conventional pull-in threshold (di/3). In this way, according to the first embodiment, the membrane MEM is displaced stepwise (e.g., in two steps). In such am approach, the membrane MEM can be displaced by more than the conventional pull-in threshold (di/3) without the pull-in. Thus, the Fabry-Perot interferometer 100 according to the first embodiment can have an increased spectral band.

Further, according to the first embodiment, the stiffness of each of the electrodes E2, E3 is greater than the stiffness of any one of the springs B1, B2. Further, the electrodes E2, E3 are electrically isolated from the springs B1, B2. That is, the electrodes E2, E3 are structurally separated from the springs B1, B2. Therefore, when the springs B1, B2 are deformed, the membrane MEM is displaced with the electrodes E2, E3 parallel to each other. Thus, the distance between the fixed mirror M1 and the movable mirror M2 connected to the electrode E3 can be controlled flexibly. Therefore, the full width at half maximum (FWHM) of the wavelength of the transmitted light can become small so that the resolution can be improved.

Alternatively, the electrodes E2, E3 can be structurally joined to the springs B1, B2. That is, the electrode E2 can serve as the spring B1, and the electrode E3 can serve as the spring B2. In such an approach, the Fabry-Perot interferometer 100 can be simplified in structure and reduced in size.

Further, according to the first embodiment, the movable mirror structure 70 has multiple electrodes E2, E3 that are electrically isolated from each other, and the fixed mirror structure 30 has one electrode E1 that is located opposite to the electrodes E2, E3. Alternatively, the fixed mirror structure 30 can have multiple electrodes E2, E3 that are electrically isolated from each other, and the movable mirror structure 70 can have one electrode E1 that is located opposite to the electrodes E2, E3. Alternatively, the fixed mirror structure 30 and the movable mirror structure 70 can have the same number of electrodes to form multiple electrode pairs.

Further, according to the first embodiment, the Fabry-Perot interferometer 100 has two springs and two electrode pairs.

Alternatively, the Fabry-Perot interferometer 100 can have three or more springs and three or more electrode pairs. As the number of the springs and the electrode pairs is larger, the pull-in threshold is larger. That is, as the number of the springs and the electrode pairs is larger, the spectral band of the Fabry-Perot interferometer 100 is wider.

Further, according to the first embodiment, the spring constant k1 of the spring B1 is greater than the spring constant K2 of the spring B2. It is preferable that the spring constant k1 of the spring B1 be seven or more times greater than the spring constant K2 of the spring B2 (i.e., k1/k2>7) for the following reason.

The spectral band may be increased by using interfering lights of different orders (e.g., 1st-order interfering light and 2nd-order interfering light). A wavelength A of the transmitted light is given as follows:

$$\lambda = 2 \times d/m$$

Figure 7A:
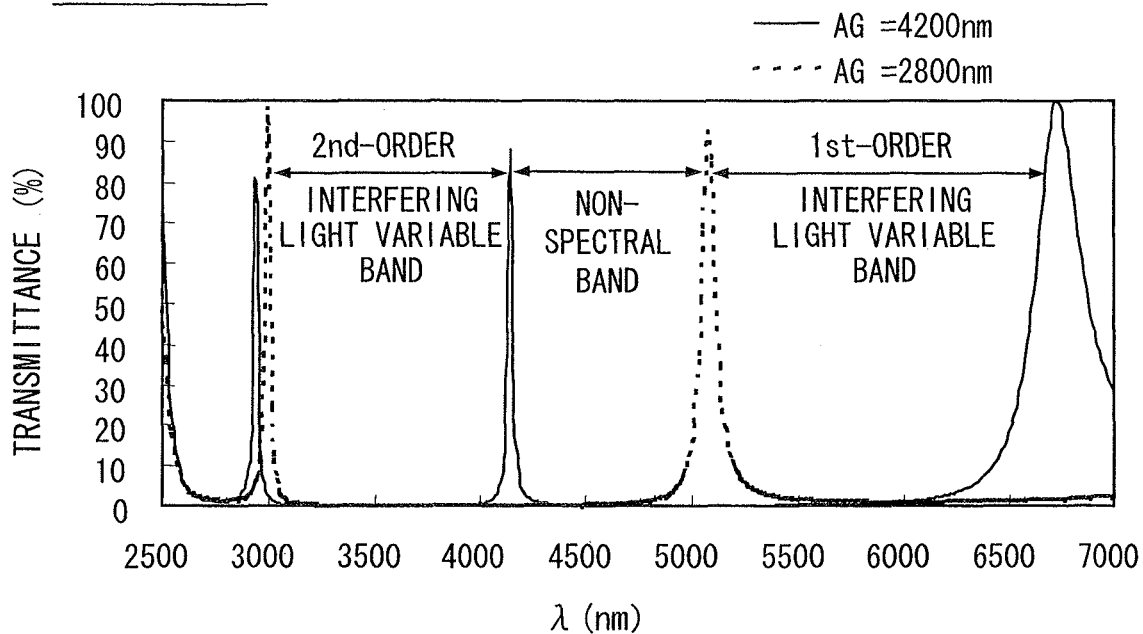
FIG. 7A is a diagram illustrating a spectral band of the conventional Fabry-Perot interferometer.

In the above equation, d is a distance between the mirrors, and m is a positive integer indicating the order of the interfering light. Therefore, the wavelength variable band of the 1st-order interfering light (m=1) is almost twice greater than a change in the distance d between the mirrors. However, in the conventional Fabry-Perot interferometer 100, the pull-in threshold is di/3. Therefore, as shown in FIG. 7A, a non-spectral band exists between the 1st-order interfering light variable band and the 2nd-order interfering light variable band. Due to the non-spectral band, it is difficult to increase the spectral band of the conventional Fabry-Perot interferometer 100.

Figure 7B:
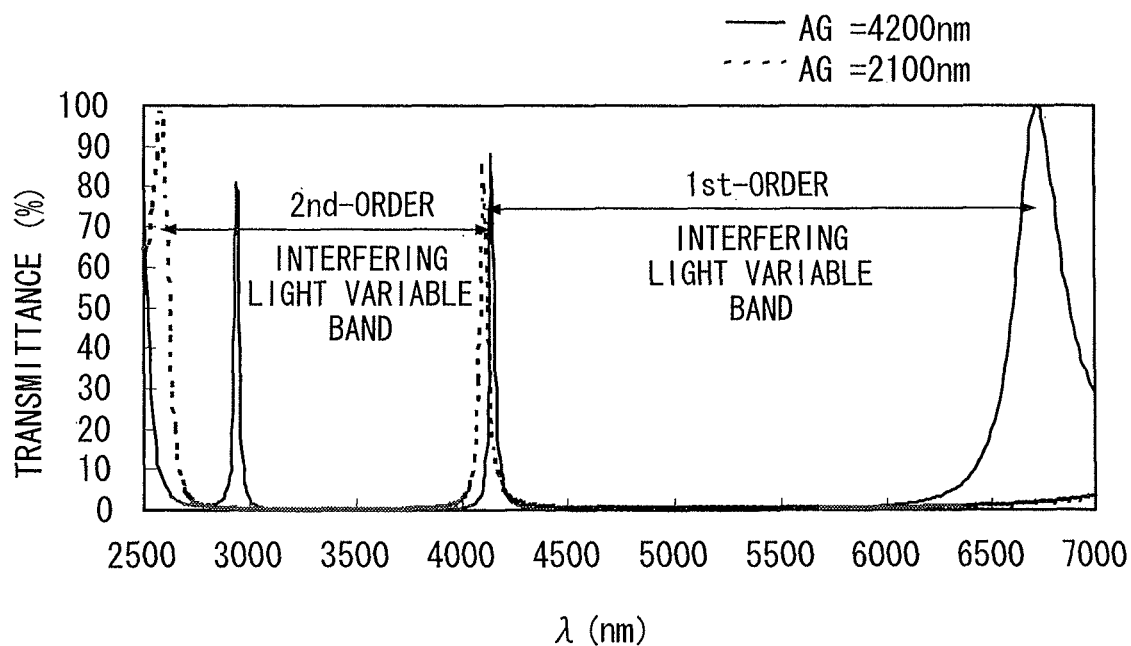
FIG. 7B is a diagram illustrating a spectral band of the Fabry-Perot interferometer according to the first embodiment in which the spring constant ratio is set to 7.

In contrast, according to the first embodiment, as shown in FIG. 5, the change in the distance between the electrodes E1, E3 can be greater than di/2 by setting the spring constant ratio k1/k2 to 7 or more. Specifically, when the spring constant ratio k1/k2 is 6, the change in the distance between the electrodes E1, E3 is slightly smaller than di/2, and when the spring constant ratio k1/k2 is 7, the change in the distance between the electrodes E1, E3 exceeds di/2. Thus, as shown in FIG. 7B, the 1st-order interfering light variable band is increased so that the 2nd-order interfering light variable band can become continuous with the 1st-order interfering light variable band. Therefore, the non-spectral band is removed. In this way, the spectral range can be improved by the interfering lights of different orders.

Second Embodiment

Figure 8A:
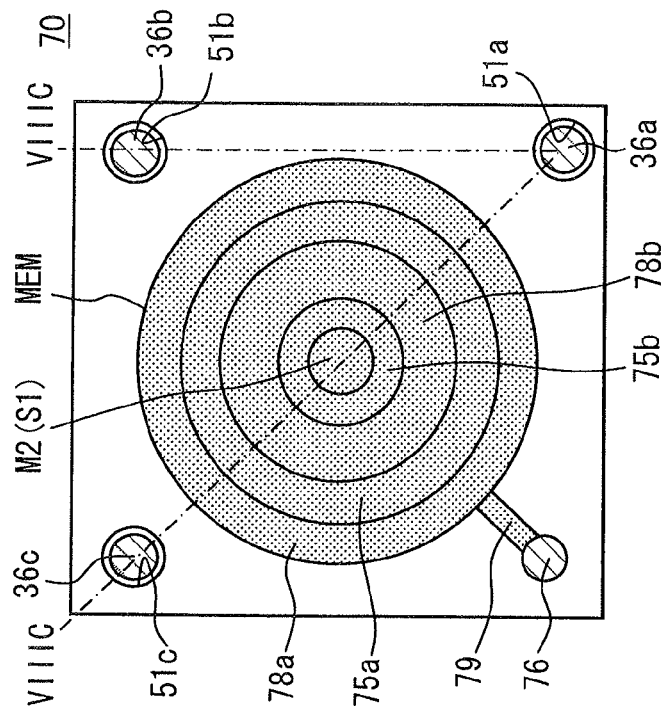
FIG. 8A is a diagram illustrating a plan view of a fixed mirror structure of a Fabry-Perot interferometer according to a second embodiment of the present invention.
Figure 8B:
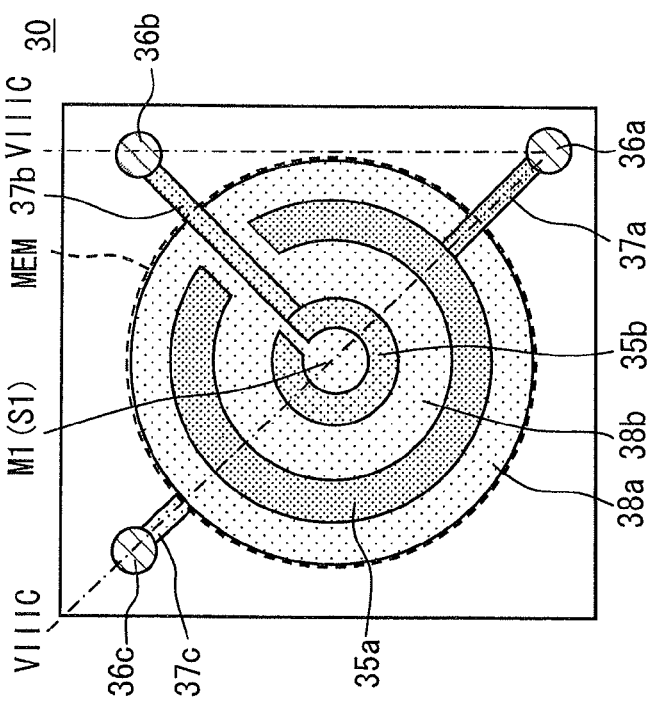
FIG. 8B is a diagram illustrating a plan view of a movable mirror structure of the Fabry-Perot interferometer according to the second embodiment.

A second embodiment of the present invention is described below with reference to FIGS. 8A-8C. In FIGS. 8A, 8B, through holes 34, 74, and 77 are omitted for the sake of simplicity. The second embodiment corresponds to a concrete example of the first embodiment.

Figure 8C:
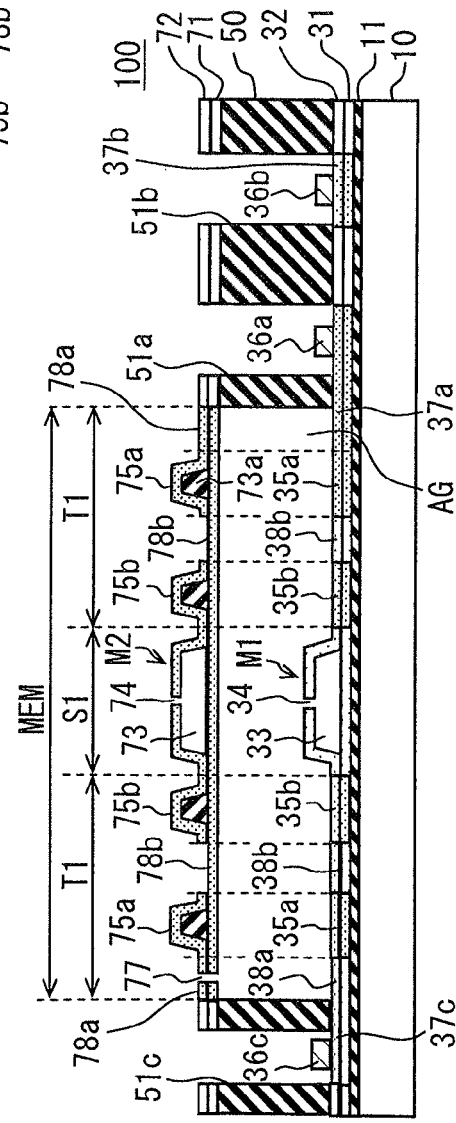
FIG. 8C is a diagram illustrating a cross-sectional view of the Fabry-Perot interferometer according to the second embodiment taken along the line VIIIC-VIIIC in FIGS. 8A and 8B.

As shown in FIG. 8C, according to the second embodiment, the fixed mirror structure 30 is located on a front surface of a substrate 10 through an insulation layer 11. For example, the substrate 10 can be a rectangular semiconductor substrate made of monocrystalline silicon. The insulation layer 11 has an approximately uniform thickness and made of silicon oxide, silicon nitride, or the like. Although not shown in the drawings, an absorption region can be selectively formed in a surface portion of the front surface of the substrate 10 outside the spectral region S1 by doping impurities into the substrate 10. In such an approach, transmittance of light outside the spectral region S1 can be reduced or prevented.

The fixed mirror structure 30 includes a high refractive bottom layer 31 and a high refractive top layer 32. The high refractive bottom layer 31 is formed on the entire front surface of the substrate 10 through the insulation layer 11. The high refractive top layer 32 is formed on the high refractive bottom layer 31. Each of the high refractive bottom layer 31 and the high refractive top layer 32 is a semiconductor thin layer made of a material having a refractive index greater than the refractive index of air. For example, the high refractive bottom layer 31 and the high refractive top layer 32 can be made of at least one of silicon and germanium. According to the second embodiment, the high refractive bottom layer 31 and the high refractive top layer 32 are made of poly-silicon.

An air layer 33 as a low refractive layer is located between the high refractive bottom layer 31 and the high refractive top layer 32 in the spectral region S1. The high refractive bottom layer 31, the high refractive top layer 32, and the air layer 33 in the spectral region S1 form the fixed mirror M1. In this way, the fixed mirror M1 is configured as an air mirror with an air layer.

The high refractive top layer 32 has a through hole 34 communicating with the air layer 33. As described later, the air layer 33 is formed by etching using the through hole 34.

The membrane MEM of the movable mirror structure 70 has a circular planar shape. The movable mirror M2 is located in the center region of the membrane MEM so that the fixed mirror M1 and the movable mirror M2 can be located opposite to each other. In the peripheral region T1 around the spectral region S1, the high refractive bottom layer 31 and the high refractive top layer 32 are in contact with each other to form a stacked layer, and electrodes are formed in the stacked layer. The electrodes are electrically isolated from each other.

Specifically, as shown in FIG. 8A, two electrodes 35a, 35b are arranged one inside the other around the spectral region S1 (i.e., around the fixed mirror M1) in such a manner that the electrode 35b can be inside the electrode 35a. The electrodes 35a, 35b are formed by doping p-type impurities (e.g., arsenic) into the stacked layer of the high refractive bottom layer 31 and the high refractive top layer 32. The electrodes 35a, 35b are substantially C-shaped. The electrode 35a is electrically connected through a wire 37a to a pad 36a. The electrode 35b is electrically connected through a wire 37b to a pad 36b. The outer electrode 35a corresponds to the electrode E2 of the first embodiment, and the inner electrode 35b corresponds to the electrode E3 of the first embodiment.

Portions 38a, 38b of each of the high refractive bottom layer 31 and the high refractive top layer 32 in peripheral region T1 are located opposite to springs 78a, 78b of the membrane MEM. N-type impurities (e.g., phosphorus) are doped into the portions 38a, 38b to ensure electrical insulation between the electrodes 35a, 35b. Further, N-type impurities are doped into gaps of the C-shaped electrodes 35a, 35b. It is noted that the N-type impurities are not doped into the wires 37a, 37b. Further, according to the embodiment, N-type impurities are doped into the high refractive bottom layer 31 and the high refractive top layer 32 in the spectral region S1 with a concentration less than a concentration with which N-type impurities are doped into the portions 38a, 38b. In this way, the fixed mirror M1 and the portions 38a, 38b, which are located opposite to the springs 78a, 78b, are electrically joined together. A wire 37c is connected to the portion 38a located opposite to the spring 78a. The wire 37c is connected to a pad 36c. For example, the pads 36a-36c can be made of Au/Cr. The pads 36a-36c are formed on the high refractive top layer 32 and form an Ohmic contact with the respective wires 37a-37c.

A supporting member 50 is formed on the high refractive top layer 32 of the fixed mirror structure 30. The supporting member 50 is not located opposite to the membrane MEM. The supporting member 50 supports the movable mirror structure 70 above the fixed mirror structure 30 in such a manner that an air gap AG can be formed between the fixed mirror structure 30 and the movable mirror structure 70. According to the second embodiment, the supporting member 50 is made of silicon dioxide and has a hollow space in its center corresponding to the membrane MEM of the movable mirror structure 70. The hollow space of the supporting member serves as the air gap AG. That is, the supporting member 50 is a sacrifice layer. The supporting member 50 has through holes 51a-51c outside the membrane MEM. The through holes 51a-51c are used to form the pads 36a-36c.

The movable mirror structure 70 includes a high refractive bottom layer 71 and a high refractive top layer 72. The high refractive bottom layer 71 is formed on the supporting member 50 over the air gap AG. The high refractive top layer 72 is formed on the high refractive bottom layer 71. Each of the high refractive bottom layer 71 and the high refractive top layer 72 is a semiconductor thin layer made of a material, such as silicon or germanium, having a refractive index greater than the refractive index of air. According to the second embodiment, each of the high refractive bottom layer 71 and the high refractive top layer 72 is made of poly-silicon.

An air layer 73 as a low refractive layer is located between the high refractive bottom layer 71 and the high refractive top layer 72 in the spectral region S1. The high refractive bottom layer 71, the high refractive top layer 72, and the air layer 73 located between the high refractive bottom layer 71 and the high refractive top layer 72 in the spectral region S1 form the movable mirror M2. In this way, the movable mirror M2 is configured as an air mirror with an air layer. The high refractive bottom layer 71 of the movable mirror M2 and the high refractive bottom layer 71 of the fixed mirror M1 are parallel to each other under a condition that no voltage is applied to electrodes 35a, 35b, 75a, and 75b.

The high refractive top layer 72 has a through hole 74 communicating with the air layer 73. The through hole 74 is used to form the air layer 73 by etching.

As shown in FIG. 8B, the movable mirror M2 is formed in the center region of the membrane MEM. In the peripheral region T1 around the spectral region S1, two springs 78a, 78b of the membrane MEM are arranged one inside the other around the spectral region S1. The spring 78b is located closer to the center of the membrane MEM than the spring 78a. In other words, the spring 78a is located closer to the outer edge of the membrane MEM than the spring 78b. A spring constant k2 of the spring 78b is smaller than a spring constant k1 of the spring 78a. Specifically, a thickness of the spring 78b is less than a thickness of the spring 78a so that the spring constant k2 of the spring 78b can be smaller than the spring constant k1 of the spring 78a. More specifically, whereas the spring 78a is a stacked layer of the high refractive bottom layer 71 and the high refractive top layer 72, the spring 78b is a single layer of the high refractive bottom layer 71. Each of the springs 78a, 78b is ring-shaped.

The electrodes 75a, 75b of the membrane MEM are ring-shaped and arranged one inside the other in the peripheral region T1 around the spectral region S1. The electrodes 75a, 75b are at the same potential and correspond to the electrode E1 of the first embodiment. The electrode 75a is formed by implanting P-type impurities or N-type impurities into a region between the spring 78a and the spring 78b. The electrode 75b is formed by implanting P-type impurities or N-type impurities into a region between the spring 78b and the spectral region S1. Thus, the spring 78a, the electrode 75a, the spring 78b, the electrode 75b, and the movable mirror M2 are arranged in this order in the direction from the outer edge of the membrane MEM to the center of the membrane MEM. The electrodes 35a, 35b of the fixed mirror structure 30 are located opposite to the electrodes 75a, 75b of the movable mirror structure 70, respectively. Thus, the springs 78a, 78b and the electrode pairs (i.e., pair of electrodes 35a, 75a and pair of electrodes 35b, 75b) are alternately arranged in the direction from the outer edge of the membrane MEM to the center of the membrane MEM.

In the membrane MEM, P-type impurities are doped into the movable mirror M2 in the spectral region S1 and the springs 78a, 78b in the peripheral region T1 in addition to the electrodes 75a, 75. The amount of impurities doped into the movable mirror M2 is less than the amount of impurities doped into the electrodes 75a, 75 or the springs 78a, 78b to prevent the doped impurities from affecting light transmittance of the movable mirror M2. Further, the amount of impurities doped into the movable mirror M2 is adjusted so that the movable mirror M2 can be at the same potential as the electrodes 75a, 75b. The outer spring 78a is connected to a wire 79. The wire 79 is connected to a pad 76. For example, the pad 76 can be made of Au/Cr. The pad 76 is located on the high refractive top layer 72 and forms an Ohmic contact with the wire 79.

Each of the electrodes 75a, 75b is constructed with the high refractive bottom layer 71, the high refractive top layer 72, and a low refractive layer 73a interposed between the high refractive bottom layer 71 and the high refractive top layer 72. The low refractive layer 73a is solid and has a refractive index less than the refractive index of each of the high refractive bottom layer 71 and the high refractive top layer 72. For example, the low refractive layer 73a can be made of silicon dioxide. In this way, each of the electrodes 75a, 75b of the membrane MEM has a three-layer structure including the high refractive bottom layer 71, the high refractive top layer 72, and the low refractive layer 73a. Thus, the stiffness of each of the electrodes 75a, 75b is greater than the stiffness of any one of the springs 78a, 78b.

The membrane MEM has a through hole 77. As described later, the supporting member 50 and the low refractive layer of the fixed mirror M1 are etched by using the through hole 77.

According to the second embodiment, the high refractive layers 31, 32, 71, 72 are made of poly-silicon. In such an approach, the mirrors are transparent to infrared light of a wavelength ranging from about 2 μm to about 10 μm. Therefore, the Fabry-Perot interferometer can be suitably used as a wavelength-selective filter for an infrared gas sensor. The same effect can be expected when the high refractive layers 31, 32, 71, 72 are made of a material having at least one of silicon and germanium, such as poly-germanium or poly-silicon-germanium.

Further, according to the second embodiment, the air layers 33, 73 are used as low refractive layers of the mirrors M1, M2. In such an approach, a refractive index ratio between the high refractive layer and the low refractive layer becomes large. Therefore, the Fabry-Perot interferometer 100 capable of selectively transmitting infrared light of a wavelength ranging from about 2 μm to about 10 μm can be manufactured at low cost.

Further, according to the second embodiment, the springs 78a, 78b have different thicknesses and thus different spring constants. Specifically, the spring 28b is located closer to the center of the membrane MEM than the spring 28a, the thickness of the spring 28b is less than the thickness of the spring 28a so that the spring constant of the spring 28b can be less than the spring constant of the spring 28a. Therefore, like the first embodiment, when the voltage V2 is applied to the inner electrode pair of electrodes 35b, 75b under a condition that the movable mirror M2 of the membrane MEM is displaced upon application of the voltage V1 to the outer electrode pair of electrodes 35a, 75a, the inner spring 78b is deformed with little or no deformation of the outer spring 78a due to the fact that the spring constant k1 of the outer spring 78a is greater than the spring constant K2 of the inner spring 78b. Accordingly, the movable mirror M2 of the membrane MEM is further displaced.

Further, according to the second embodiment, the electrodes 75a, 75b are structurally separated from the springs 78a, 78b so that the stiffness of the electrodes 75a, 75b can be greater than the stiffness of the springs 78a, 78b. Therefore, when the springs 78a, 78b are deformed, the membrane MEM is displaced with the electrodes 75a, 75b parallel to each other. Thus, the distance between the fixed mirror M1 and the movable mirror M2 can be controlled flexibly. Therefore, the full width at half maximum (FWHM) of the wavelength of the transmitted light can become small so that the resolution can be improved.

Further, according to the second embodiment, the fixed mirror structure 30 has multiple electrodes 35a, 35b that are electrically isolated from each other, and the movable mirror structure 70 has the electrodes 75a, 75b. Since the electrodes 75a, 75b are at the same potential, the electrodes 75a, 75b can be considered as one electrode. That is, it can be considered that the membrane MEM has one electrode. Therefore, the number of the wire 79 crossing over the springs 78a, 78b can be reduced. Accordingly, the springs 78a, 78b have a good symmetry so that the membrane MEM can be deformed with the movable mirror M2 parallel with the fixed mirror M1. Therefore, the full width at half maximum (FWHM) of the wavelength of the transmitted light can be small so that the resolution can be improved.

Further, according to the second embodiment, when the spring constant ratio k1/k2 is set to 7 or more, the change in the distance between the inner electrodes 35b, 75b can exceed di/2. Thus, as described in the first embodiment with reference to FIG. 7B, the 1st-order interfering light variable band is increased so that the 2nd-order interfering light variable band can become continuous with the 1st-order interfering light variable band. Therefore, the non-spectral band is removed. In this way, the spectral range can be improved by the interfering lights of different orders.

Further, according to the second embodiment, since the air layers 33, 73 are used as low refractive layers of the mirrors M1, M2, the mirrors M1, M2 can have a high reflectivity over a wide band. Thus, the Fabry-Perot interferometer 100 can have a wide spectral band.

Further, according to the second embodiment, the electrodes 35a, 35b of the fixed mirror structure 30 are electrically isolated from each other by PN junction isolation. Thus, the electrodes 35a, 35b are surely isolated from each other. Alternatively, the electrodes 35a, 35b can be isolated from each other by trench isolation. In this case, a low refractive layer (not shown) is placed between the high refractive bottom layer 31 and the high refractive top layer 32, and a trench is formed in the high refractive top layer 32 by using the low refractive layer as an etching stopper. When multiple electrodes are formed in the movable mirror structure 70, the electrodes can be electrically isolated from each other by forming a trench in the high refractive top layer 32 by using the low refractive layer 73a as an etching stopper.

Like the first embodiment, the electrodes 75a, 75b can be structurally joined to the springs 78a, 78b. That is, the electrode 75a can serve as the spring 78a, and the electrode 75b can serve as the spring 78b. In this case, the electrode 75a, the electrode 75b, and the movable mirror M2 are arranged in this order in the direction from the outer edge of the membrane MEM to the center of the membrane MEM.

Figure 9A:
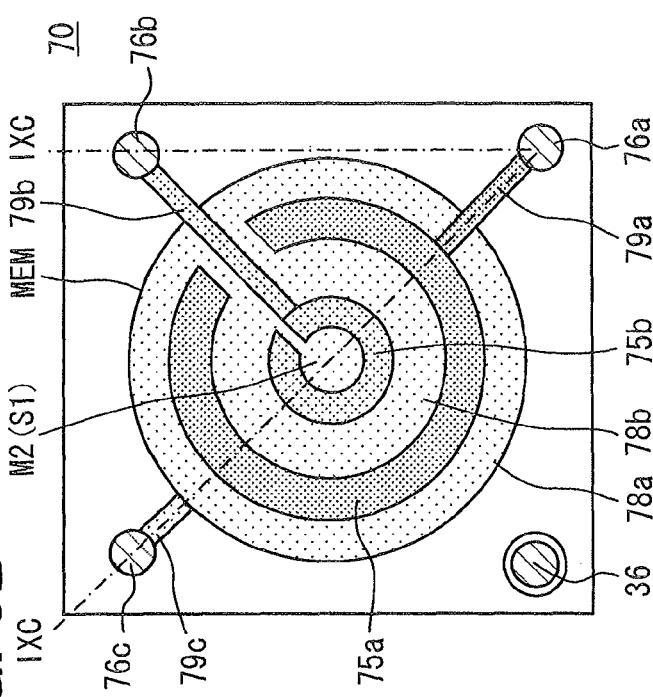
FIG. 9A is a diagram illustrating a plan view of a fixed mirror structure of a Fabry-Perot interferometer according to a first modification of the second embodiment.
Figure 9B:
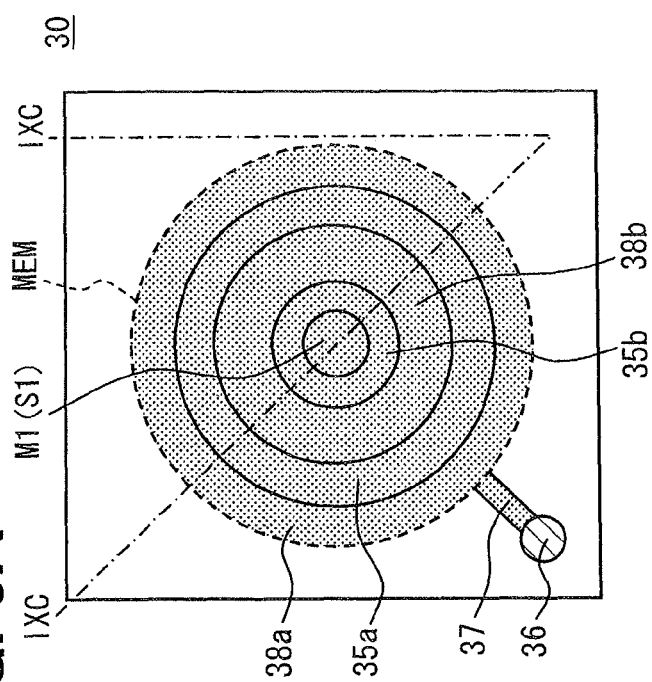
FIG. 9B is a diagram illustrating a plan view of a movable mirror structure of the Fabry-Perot interferometer according to the first modification of the second embodiment.
Figure 9C:
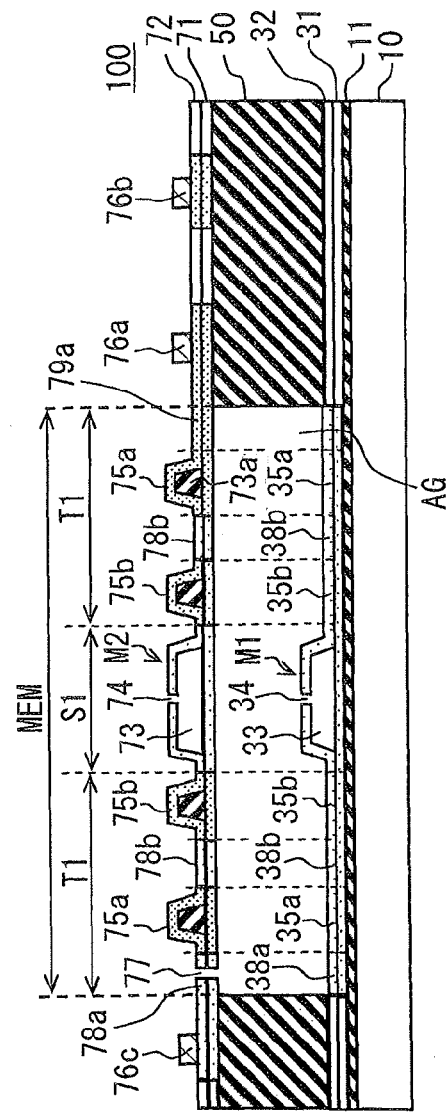
FIG. 9C is a diagram illustrating a cross-sectional view of the Fabry-Perot interferometer according to the first modification of the second embodiment taken along the line IXC-IXC in FIGS. 9A and 9B.

Alternatively, as shown in FIGS. 9A-9C, the movable mirror structure 70 can have multiple electrodes 75a, 75b that are electrically isolated from each other, and the fixed mirror structure 30 can have one electrode, constructed with electrodes 35a, 35b that are at the same potential, located opposite to the electrodes 75a, 75b. In such an approach, the number of through holes 51 formed in the supporting member 50 can be reduced. Thus, stiffness of the supporting member 50 is increased so that stiffness of the Fabry-Perot interferometer 100 can be increased. It is noted that through holes 34, 74, and 77 are omitted in FIGS. 9A, 9B for the sake of simplicity.

Alternatively, the fixed mirror structure 30 and the movable mirror structure 70 can have the same number of electrodes to form multiple electrode pairs that are electrically isolated from each other. That is, the electrode pair of electrodes 75a, 35a can be electrically isolated from the electrode pair of electrodes 75b, 35b.

According to the second embodiment, the Fabry-Perot interferometer 100 has two springs 78a, 78b and two electrode pairs. Alternatively, the Fabry-Perot interferometer 100 can have three or more springs and three or more electrode pairs.

Figure 10A:
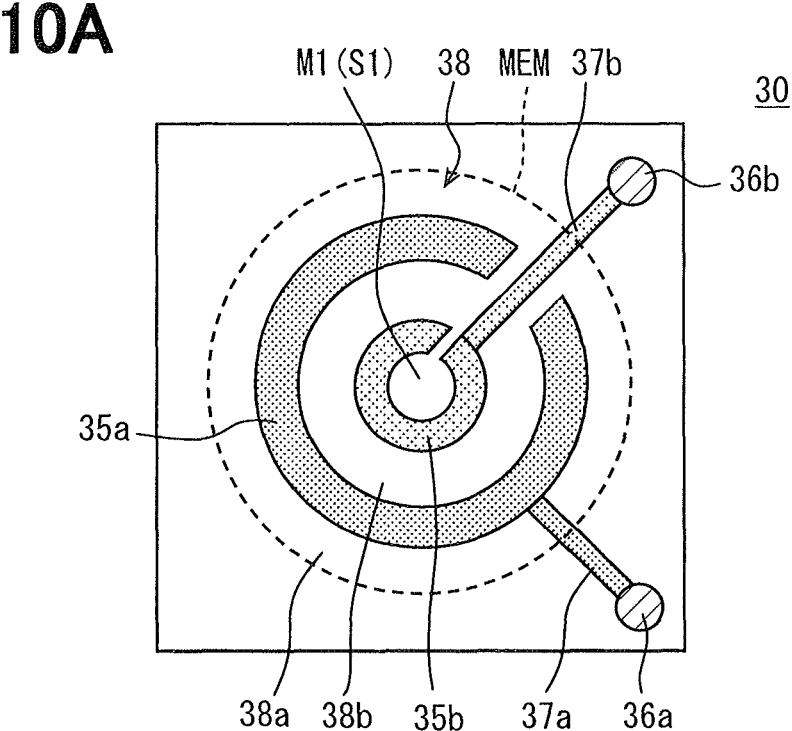
FIG. 10A is a diagram illustrating a plan view of a fixed mirror structure of a Fabry-Perot interferometer according to a second modification of the second embodiment.
Figure 10B:
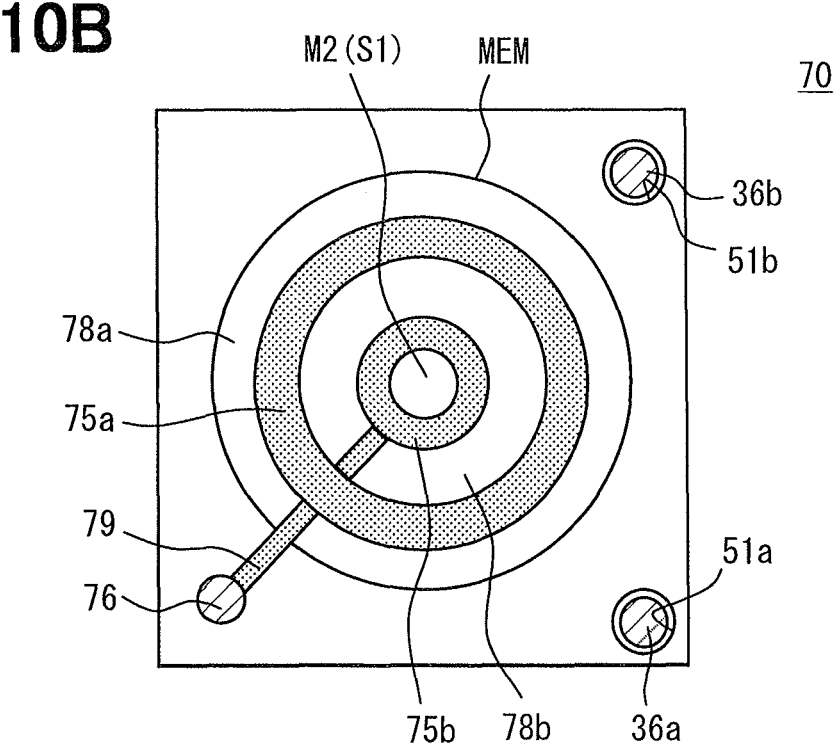
FIG. 10B is a diagram illustrating a plan view of a movable mirror structure of the Fabry-Perot interferometer according to the second modification of the second embodiment.

According to the second embodiment, the impurities are doped into some portions of the membrane MEM and the fixed mirror structure 30 in addition to the electrodes 35a, 35b, 75a, 75b and the wires 37a, 37b. Alternatively, as shown in FIGS. 10A, 10B, the impurities can be doped into only the electrodes 35a, 35b, 75a, 75b and the wires 37a, 37b.

Next, a method of manufacturing the Fabry-Perot interferometer 100 according to the second embodiment is described below with reference to FIGS. 11A-11C and 12A-12C. Here, a method of manufacturing the Fabry-Perot interferometer 100 of FIGS. 8A-8C is described.

Figure 11A:
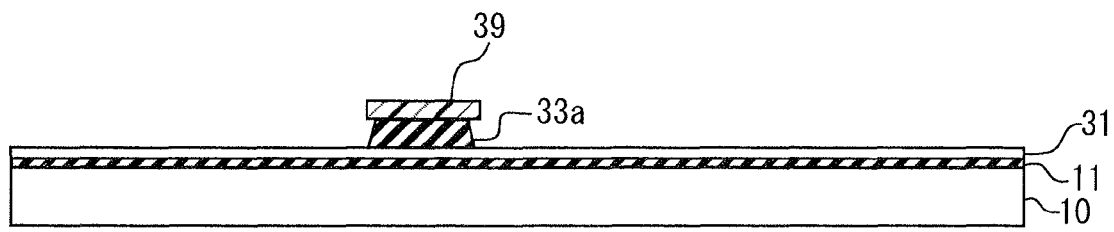
FIGS. 11A-11C are diagrams illustrating a method of manufacturing the Fabry-Perot interferometer according to the second embodiment.

Firstly, in a process shown in FIG. 11A, a semiconductor substrate made of monocrystalline silicon is prepared as the substrate 10. Then, if necessary, impurities such as arsenic are doped into the front surface of the substrate 10 in a region outside the spectral region 51 to form an absorption region. Then, the insulation layer 11 made of such as silicon nitride is uniformly formed on the entire front surface of the substrate 10.

Then, the high refractive bottom layer 31 made of such as poly-silicon is formed on the insulation layer 11, and the low refractive layer 33a made of such as silicon oxide is formed on the high refractive bottom layer 31. Then, a mask 39 made of such as resist is formed on the low refractive layer 33a. Then, the low refractive layer 33a is etched and patterned into a predetermined shape by using the mask 39. Then, the mask 39 is removed. According to the second embodiment, the low refractive layer 33a is patterned into a truncated cone or a hexagonal truncated pyramid by isotropic wet etching. If necessary, anisotropic dry etching can be performed in addition to the wet etching. The low refractive layer 33a is removed by etching in a post-process to form the air layer 33 of the fixed mirror M1.

Figure 11B:
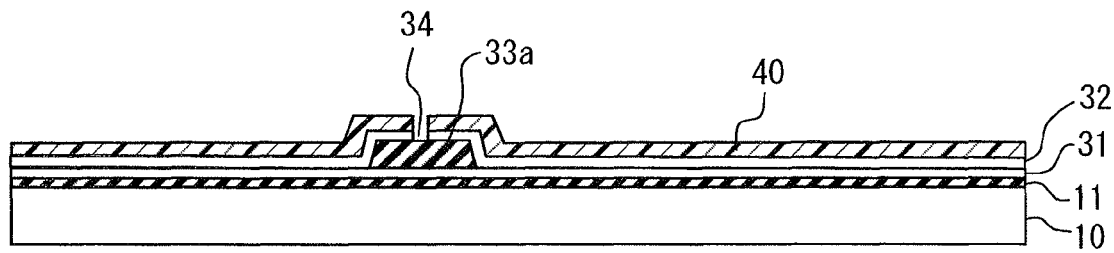

Then, in a process shown in FIG. 11B, the high refractive top layer 32 made of such as poly-silicon is formed on the high refractive bottom layer 31 so that the low refractive layer 33a can be covered with the high refractive top layer 32. Then, a mask 40 made of such as resist is formed on the high refractive top layer 32. Then, anisotropic dry etching is performed by using the mask 40 to form the through hole 34 in the high refractive top layer 32 located on the low refractive layer 33a in the spectral region S1. Then, the mask 40 is removed.

Figure 11C:
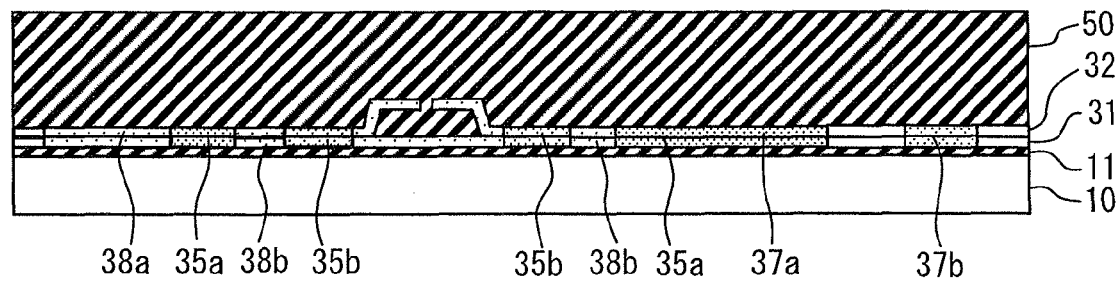

Then, in a process shown in FIG. 11C, another mask (not shown) is formed on the high refractive top layer 32. Then, impurities are doped into the high refractive top layer 32 by using the other mask to form the electrodes 35a, 35b and the wires 37a, 37b. According to the second embodiment, P-type impurities such as boron are doped into the high refractive top layer 32 to form the electrodes 35a, 35b and the wires 37a, 37b. Further, N-type impurities such as phosphorus are doped into the portions 38a, 38b, which are to be located opposite to the springs 78a, 78b of the membrane MEM, to electrically isolate the electrodes 35a, 35b from each other by PN junction. It is noted that if impurities exist in the spectral region S1, light is absorbed by the impurities. Therefore, no impurities can be doped into the spectral region S1. Alternatively, the amount of impurities doped into the spectral region S1 can be less than the amount of impurities doped into the portions 38a, 38b.

Then, after the other mask is removed, the supporting member 50 is formed on the entire surface of the high refractive top layer 32 so that the through hole 34 of the high refractive top layer 32 can be filled with the supporting member 50. The supporting member 50 is made of an electrically insulating material such as silicon dioxide. It is preferable that the supporting member 50 be made of the same material as the low refractive layer 33a. The thickness of the supporting member 50 is equal to the initial distance (i.e., distance when no voltage is applied) between the fixed mirror structure 30 and the movable mirror structure 70 (i.e., membrane MEM).

Then, if necessary, a planarization process is performed to smooth the surface of the supporting member 50. Then, in a process shown in FIG. 12A, the high refractive bottom layer 71 made of such as poly-silicon is formed on the entire surface of the supporting member 50. Then, the low refractive layer 73a is formed on the high refractive bottom layer 71. The low refractive layer 73a is made of an electrically insulating material such as silicon dioxide. It is preferable that the low refractive layer 73a be made of the same material as the supporting member 50. Then, a mask 80 made of such as resist is formed on the low refractive layer 73a. Then, the low refractive layer 73a is etched and patterned into a predetermined shape by using the mask 80. Then, the mask 80 is removed. According to the second embodiment, the low refractive layer 73a is patterned into a truncated cone or a hexagonal truncated pyramid by isotropic wet etching. If necessary, anisotropic dry etching can be performed in addition to the wet etching. The low refractive layer 73a in the spectral region S1 is removed by etching in a post-process to form the air layer 73 of the movable mirror M2. In contrast, the low refractive layer 73a in the peripheral region T1 is used to form the electrodes 75a, 75b.

Then, the mask 80 is removed. Then, in a process shown in FIG. 12B, a resist 81 is formed at a position where the spring 78b is to be formed. Then, the high refractive top layer 72 made of such as poly-silicon is formed on the high refractive bottom layer 71 so that the low refractive layer 73a and the resist 81 can be covered with the high refractive top layer 72.

Figure 12A:
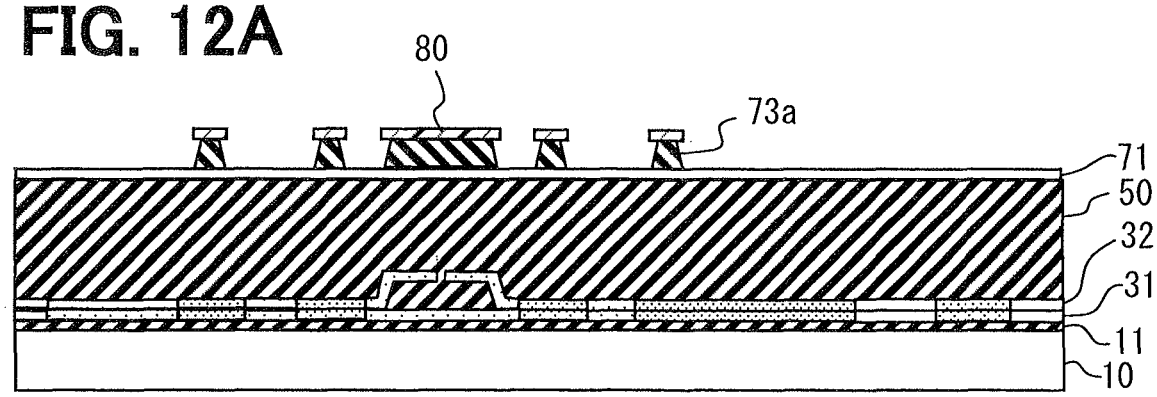
FIGS. 12A-12C are diagrams illustrating the method of manufacturing the Fabry-Perot interferometer according to the second embodiment.
Figure 12B:
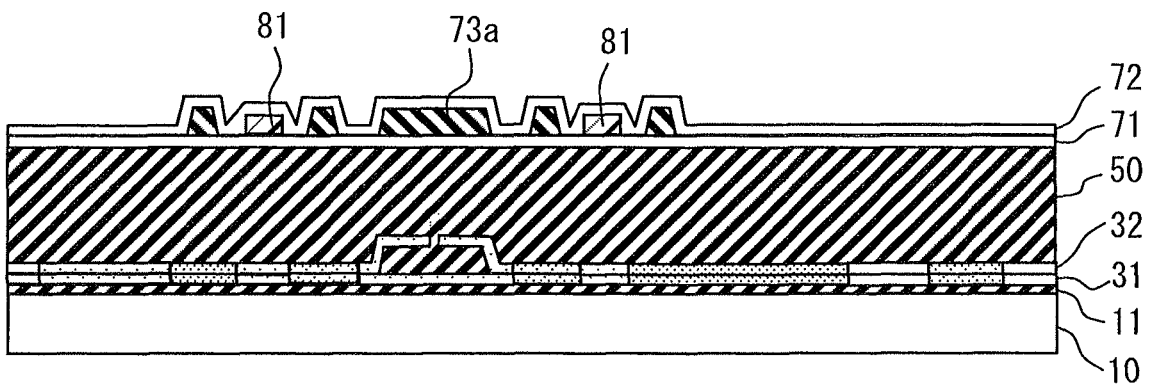
Figure 12C:
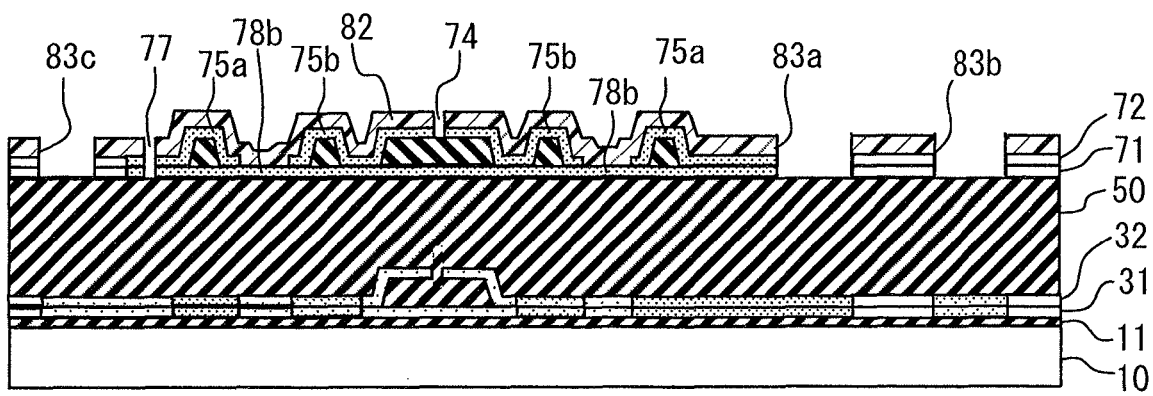

Then, in a process shown in FIG. 12C, the resist 81 is removed so that the high refractive top layer 72 on the resist 81 can be lifted off (i.e., removed). Then, another mask (not shown) is formed on the high refractive top layer 72. Then, impurities are doped into the high refractive top layer 72 by using the other mask to form the electrodes 75a, 75b, and the wire 79. At this time, the impurities can be doped into the spectral region S1 and the springs 78a, 78b of the membrane MEM. It is noted that if impurities exist in the spectral region S1, light is absorbed by the impurities. Therefore, no impurities can be doped into the spectral region S1. Alternatively, the amount of impurities doped into the spectral region S1 can be less than the amount of impurities doped into the other regions (i.e., the electrodes 75a, 75b and the springs 78a, 78b).

Then, in a process shown in FIG. 12C, a mask 82 is formed on the high refractive top layer 72. Then, the high refractive bottom layer 71 and the high refractive top layer 72 are selectively etched by using the mask 82 to form the through hole 77 in the high refractive bottom layer 71 and the high refractive top layer 72. The through hole 77 is used to etch the supporting member 50. Further, in the spectral region S1, the through hole 74 is formed in the high refractive top layer 72 located on the low refractive layer 73a so that the low refractive layer 73a can be exposed through the through hole 74. Further, openings 83a-83c are formed at positions where the through holes 51a-51c are to be formed.

Then, although not shown in the drawings, after the mask 82 is removed, an anisotropic etching is performed by using the high refractive top layer 72 as a mask. Thus, the supporting member 50 is partially removed so that the through holes 51a-51c can be formed in the supporting member 50. Then, an Au/Cr layer is formed by using a metal mask, and the pads 36a-36c are formed in the holes 51a-51c, respectively. At this time, the pad 76 is formed on the high refractive top layer 72 outside the membrane MEM. If necessary, the pads 36a-36c, and 76 are polished. Then, the air gap AG is formed by etching the supporting member 50 through the through hole 77. At this time, the air layer 33 is formed by etching the low refractive layer 33a in the spectral region S1 through the through hole 34, and the air layer 73 is formed by etching the low refractive layer 73a in the spectral region S1 through the through hole 74. The low refractive layer 73a outside the spectral region S1 is not etched, because the low refractive layer 73a outside the spectral region S1 is part of the electrodes 75a, 75b. In this way, the Fabry-Perot interferometer 100 of FIGS. 8A-8C is manufactured.

In the above method, the spring 78b is thinned by removing the resist 81 by a lift-off process. Alternatively, the spring 78b can be thinned as follows. The low refractive layer 73a is placed instead of the resist 81, and the high refractive top layer 72 is removed by etching the high refractive top layer 72 using the low refractive layer 73a as an etching stopper. Then, the low refractive layer 73a is removed. Alternatively, the spring 78b can be thinned as follows. The high refractive top layer 72 is thermally-oxidized at a position where the spring 78b is to be formed, and the thermally-oxidized portion of the high refractive top layer 72 is selectively removed.

Third Embodiment

A Fabry-Perot interferometer 100 according to a third embodiment of the present invention is described below with reference to FIGS. 13A-13C. In FIGS. 13A, 13B, the through holes 34, 74, and 77 are omitted for the sake of simplicity. The Fabry-Perot interferometer 100 of the third embodiment is similar to the Fabry-Perot interferometer 100 of the second embodiment shown in FIGS. 8A-8C. Differences between the second embodiment and the third embodiment are as follows.

According to the third embodiment, through holes 84a, 84b are formed in the stacked layer of the high refractive bottom layer 71 and the high refractive top layer 72 of the membrane MEM so that each of the springs 78a, 78b can have a beam structure. The springs 78a, 78b differ from each other in at least one of the number of beams, the length of the beam in a direction from the outer edge of the membrane MEM to the center of the membrane MEM, and the width of the beam, in such a manner that the spring constant k2 of the spring 78b, which is located closer to the center of the membrane MEM than the spring 78a, can be smaller than the spring constant k1 of the spring 78a.

As shown in FIGS. 13B, 13C, the through holes 84a, 84b are not formed in the electrodes 75a, 75b in the peripheral region T1. Thus, the stiffness of the electrodes 75a, 75b is greater than the springs 78a, 78b. According to the second embodiment, each of the springs 78a, 78b has four beams. The length of the beam of the inner spring 78b is greater than the length of the beam of the outer spring 78a, and the width of the beam of the inner spring 78b is less than the width of the beam of the outer spring 78a. It is noted that the spring constant is larger, as the number of the beams is larger, the length of the beam is smaller, and the width of the beam is larger. Thus, the spring constant k2 of the spring 78b is smaller than the spring constant k1 of the spring 78a.

In this way, when the springs 78a, 78b have beam structures, the spring constants of the springs 78a, 78b can be easily adjusted by changing the number of beams, the length of the beam, and the width of the beam. Thus, flexibility in designing the spring constants can be improved. The through holes 84a, 84b can be formed in the supporting member 50 in the same process as the air gap AG is formed in the supporting member 50. Thus, the beam structures of the springs 78a, 78b can be formed without additional process. Accordingly, the manufacturing process of the Fabry-Perot interferometer 100 can be simplified.

In an example shown in FIGS. 13A-13C, the low refractive layer 73a is located between the high refractive bottom layer 71 and the high refractive top layer 72 to form the electrodes 75a, 75b. Alternatively, the high refractive bottom layer 71 and the high refractive top layer 72 can be in contact with each other without the low refractive layer 73a. A reason for this is that the through holes 84a, 84b are not formed in the electrodes 75a, 75b so that the stiffness of the electrodes 75a, 75b can be greater than the springs 78a, 78b without the low refractive layer 73a.

A method of manufacturing the Fabry-Perot interferometer 100 of the third embodiment is almost the same as the method of manufacturing the Fabry-Perot interferometer 100 of the second embodiment except the following points: The first point is that the process of forming the resist 81 and the process of thinning the spring 78a by the lift-off process are not required in the third embodiment. The second point is that additional process of forming the through holes 84a, 84b is required in the third embodiment.

Specifically, after the high refractive top layer 72 is formed, a mask having openings corresponding to the through holes 84a, 84b is formed on the high refractive top layer 72. Then, the high refractive bottom layer 71 and the high refractive top layer 72 are etched by anisotropic dry etching using the mask. Thus, the through holes 84a, 84b are formed so that the springs 78a, 78b can have the beam structures. Then, after the mask is removed, the mask 82 is formed on the high refractive top layer 72 so that the through holes 84a, 84b can be covered with the mask 82. Then, as shown in FIG. 12C, the high refractive bottom layer 71 and the high refractive top layer 72 are selectively removed by etching so that the through hole 77 can be formed in the high refractive bottom layer 71 and the high refractive top layer 72. The through hole 77 is used to etch the supporting member 50. Further, in the spectral region 51, the through hole 74 is formed in the high refractive top layer 72 located on the low refractive layer 73a so that the low refractive layer 73a can be exposed through the through hole 74. Further, the openings 83a-83c are formed at positions where the through holes 51a-51c are to be formed.

Fourth Embodiment

A Fabry-Perot interferometer 100 according to a fourth embodiment of the present invention is described below with reference to FIGS. 14A-14C. In FIGS. 14A, 14B, the through holes 34, 74, and 77 are omitted for the sake of simplicity. The Fabry-Perot interferometer 100 of the fourth embodiment is similar to the Fabry-Perot interferometer 100 of the second embodiment shown in FIGS. 8A-8C. Differences between the second embodiment and the fourth embodiment are as follows.

According to the fourth embodiment, the through holes 77 instead of the through holes 84a, 84b of the third embodiment are formed in the stacked layer of the high refractive bottom layer 71 and the high refractive top layer 72 of the membrane MEM. The through hole 77 is smaller in size than the through holes 84a, 84b. Specifically, the through hole 77 is small enough to prevent the springs 78a, 78b from having the beam structure. The springs 78a, 78b differ from each other in at least one of the size and density of the through hole 77, so that the spring constant k2 of the spring 78b, which is located closer to the center of the membrane MEM than the spring 78a, can be smaller than the spring constant k1 of the spring 78a.

As shown in FIGS. 14B, 14C, the through holes 77 are not formed in the electrodes 75a, 75b in the peripheral region T1. Thus, the stiffness of the electrodes 75a, 75b is greater than the springs 78a, 78b. According to the second embodiment, a lot of through holes 77 are formed in the springs 78a, 78b in such a manner that the density of the through hole 77 in the inner spring 78b can be greater than the density of the through hole 77 in the outer spring 78a. It is noted that the spring constant is smaller, as the density of the through hole 77 is larger, and the size of the through hole 77 is larger. Thus, the spring constant k2 of the spring 78b is smaller than the spring constant k1 of the spring 78a.

In this way, the spring constants of the springs 78a, 78b can be easily adjusted by changing the size and the density of the through hole 77. Thus, flexibility in designing the spring constants can be improved. Like the preceding embodiments, the through holes 77 are used to form the air gap AG in the supporting member 50. Thus, the through holes 77 can be formed without additional process. Accordingly, the manufacturing process of the Fabry-Perot interferometer 100 can be simplified. A method of manufacturing the Fabry-Perot interferometer 100 of the fourth embodiment is almost the same as the method of manufacturing the Fabry-Perot interferometer 100 of the second embodiment except that the process of forming the resist 81 and the process of thinning the spring 78a by the lift-off process are not required in the fourth embodiment. Therefore, the Fabry-Perot interferometer 100 of the fourth embodiment can be manufactured more easily than the Fabry-Perot interferometer 100 of the second embodiment.

In an example shown in FIGS. 14A-14C, the low refractive layer 73a is located between the high refractive bottom layer 71 and the high refractive top layer 72 to form the electrodes 75a, 75b. Alternatively, the high refractive bottom layer 71 and the high refractive top layer 72 can be in contact with each other without the low refractive layer 73a. A reason for this is that the through holes 77 are not formed in the electrodes 75a, 75b so that the stiffness of the electrodes 75a, 75b can be greater than the springs 78a, 78b without the low refractive layer 73a.

Fifth Embodiment

Figure 15A:
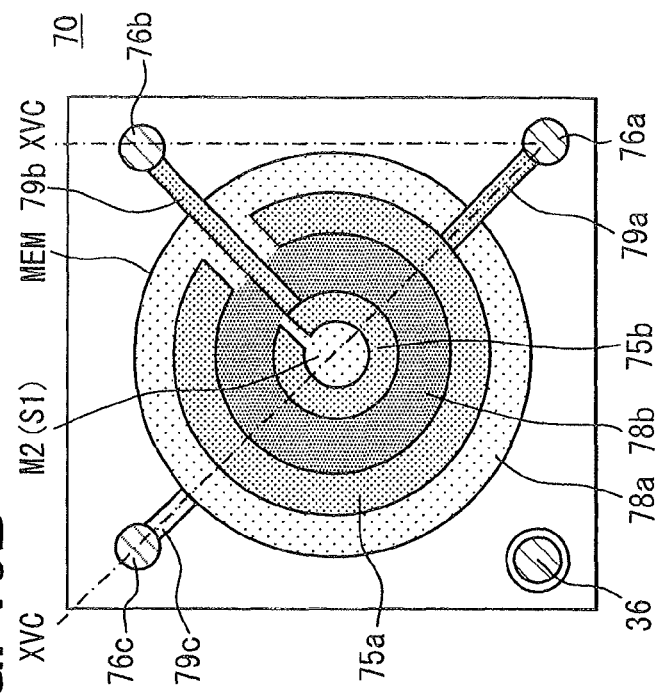
FIG. 15A is a diagram illustrating a plan view of a fixed mirror structure of a Fabry-Perot interferometer according to a fifth embodiment of the present invention.
Figure 15B:
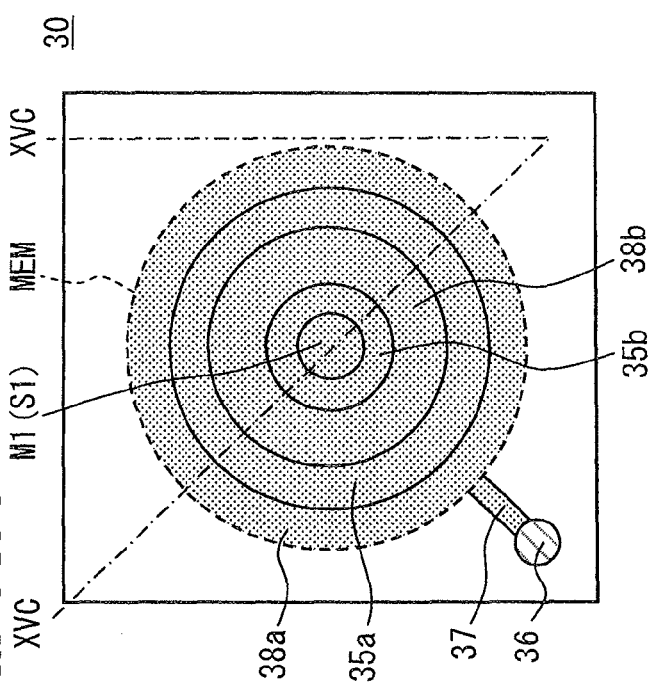
FIG. 15B is a diagram illustrating a plan view of a movable mirror structure of the Fabry-Perot interferometer according to the fifth embodiment.

A Fabry-Perot interferometer 100 according to a fifth embodiment of the present invention is described below with reference to FIGS. 15A-15C. In FIGS. 15A, 15B, the through holes 34, 74, and 77 are omitted for the sake of simplicity. The Fabry-Perot interferometer 100 of the fifth embodiment is similar to the Fabry-Perot interferometer 100 of the second embodiment shown in FIGS. 8A-8C. Differences between the second embodiment and the fifth embodiment are as follows.

According to the fifth embodiment, the springs 78a, 78b differ from each other in the amount of doped impurities, so that the spring constant k2 of the spring 78b, which is located closer to the center of the membrane MEM than the spring 78a, can be smaller than the spring constant k1 of the spring 78a.

Figure 15C:
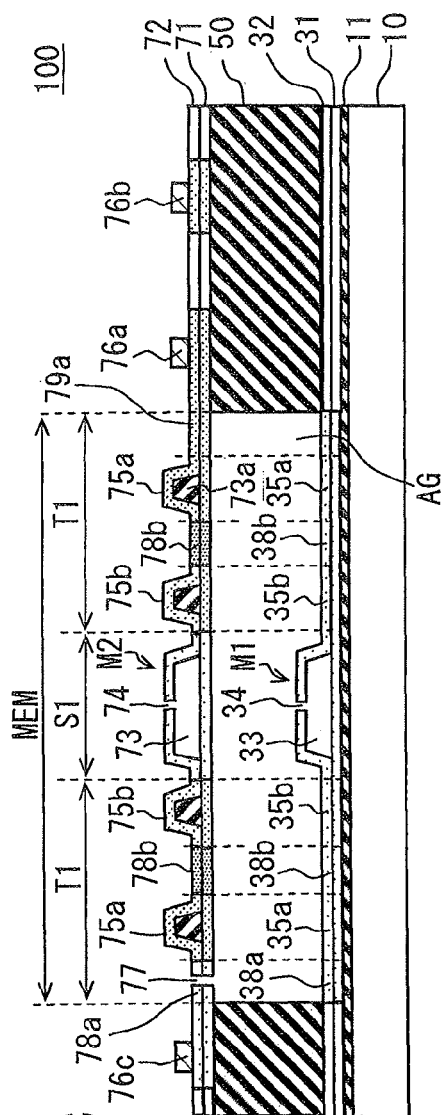
FIG. 15C is a diagram illustrating a cross-sectional view of the Fabry-Perot interferometer according to the fifth embodiment taken along the line XVC-XVC in FIGS. 15A and 15B.

As shown in FIGS. 15B, 15C, the springs 78a, 78b are formed from the stacked layer of the high refractive bottom layer 71 and the high refractive top layer 72 of the membrane MEM in the peripheral region T1. The inner stress in the high refractive bottom layer 71 and the high refractive top layer 72 is tensile stress to prevent buckling of the membrane MEM. The amount of impurities doped in the inner spring 78b is greater than the amount of impurities doped in the outer spring 78a. It is noted that the inner stress (i.e., tensile stress) is smaller so that the stiffness can be smaller, as the amount of doped impurities is larger. That is, the spring constant is smaller, as the amount of doped impurities is larger. Thus, the spring constant k2 of the spring 78b is smaller than the spring constant k1 of the spring 78a. At least one of the amount of doped impurities and the inner stress needs to be adjusted to prevent buckling of the membrane MEM.

In this way, the spring constants of the springs 78a, 78b can be easily adjusted by changing the amount of doped impurities. Thus, flexibility in designing the spring constants can be improved. Like the preceding embodiments, the impurities are doped to form PN junctions to electrically isolate the electrodes 75a, 75b from each other. Therefore, the impurities can be doped into the springs 78a, 78b without additional process. Accordingly, the manufacturing process of the Fabry-Perot interferometer 100 can be simplified.

The impurities can be doped only in the spring 78b. In other word, there is no need to dope impurities in the spring 78a. Even in such an approach, the spring constant k2 of the spring 78b can be smaller than the spring constant k1 of the spring 78a.

When the fixed mirror structure 30 has multiple electrodes 35a, 35b, the amount of impurities doped in the inner spring 78b can be greater than the amount of impurities doped in the outer spring 78a so that the spring constant k2 of the spring 78b can be smaller than the spring constant k1 of the spring 78a. In this case, a conductivity type (e.g., P-type) of the impurities doped to isolate the electrodes 35a, 35b can be different from a conductivity type (e.g., N-type) of the impurities doped into the springs 78a, 78b.

The electrodes 75a, 75b are formed by interposing the low refractive layer 73a between the high refractive bottom layer 71 and the high refractive top layer 72. Therefore, although impurities are doped into the electrodes 75a, 75b, the stiffness of each of the electrodes 75a, 75b is greater than the stiffness of any one of the springs 78a, 78b.

Sixth embodiment

Figure 16A:
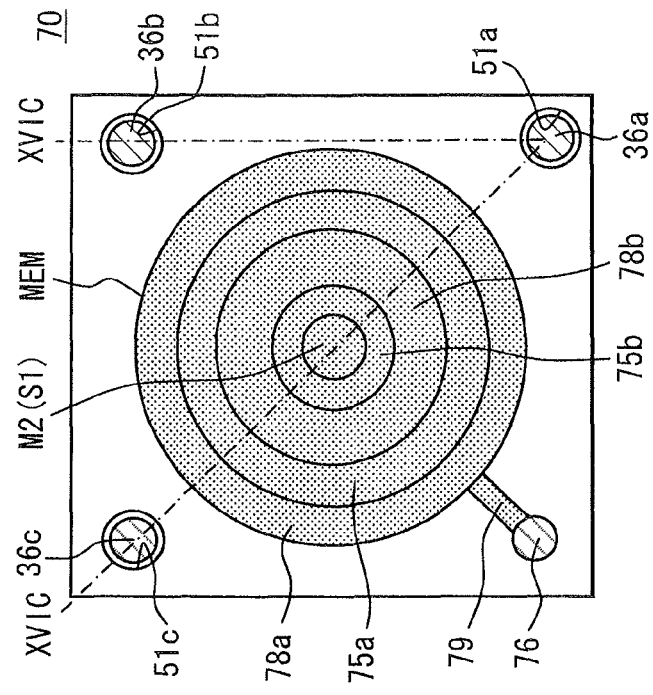
FIG. 16A is a diagram illustrating a plan view of a fixed mirror structure of a Fabry-Perot interferometer according to a sixth embodiment of the present invention.
Figure 16B:
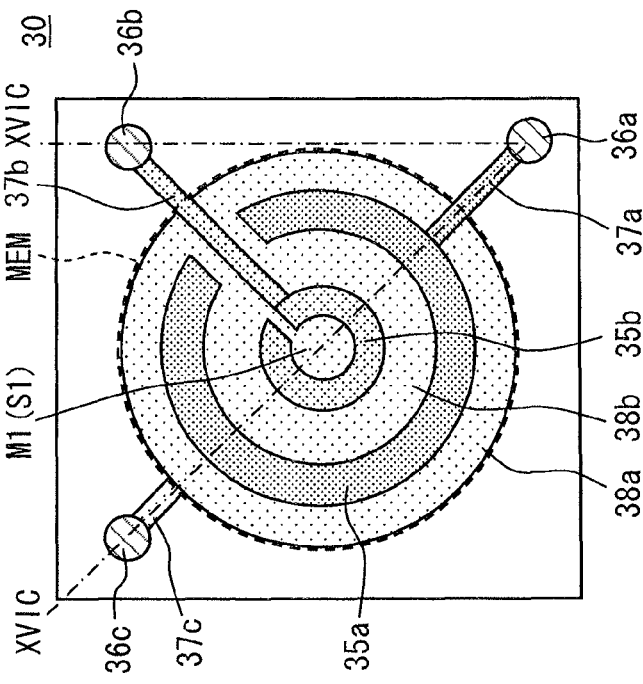
FIG. 16B is a diagram illustrating a plan view of a movable mirror structure of the Fabry-Perot interferometer according to the sixth embodiment.

A Fabry-Perot interferometer 100 according to a sixth embodiment of the present invention is described below with reference to FIGS. 16A-16C. In FIGS. 16A, 16B, the through holes 34, 74, and 77 are omitted for the sake of simplicity. The Fabry-Perot interferometer 100 of the sixth embodiment is similar to the Fabry-Perot interferometer 100 of the second embodiment shown in FIGS. 8A-8C. Differences between the second embodiment and the sixth embodiment are as follows.

According to the sixth embodiment, the springs 78a, 78b are made of different materials having different Young's moduli, so that the spring constant k2 of the spring 78b, which is located closer to the center of the membrane MEM than the spring 78a, can be smaller than the spring constant k1 of the spring 78a.

Figure 16C:
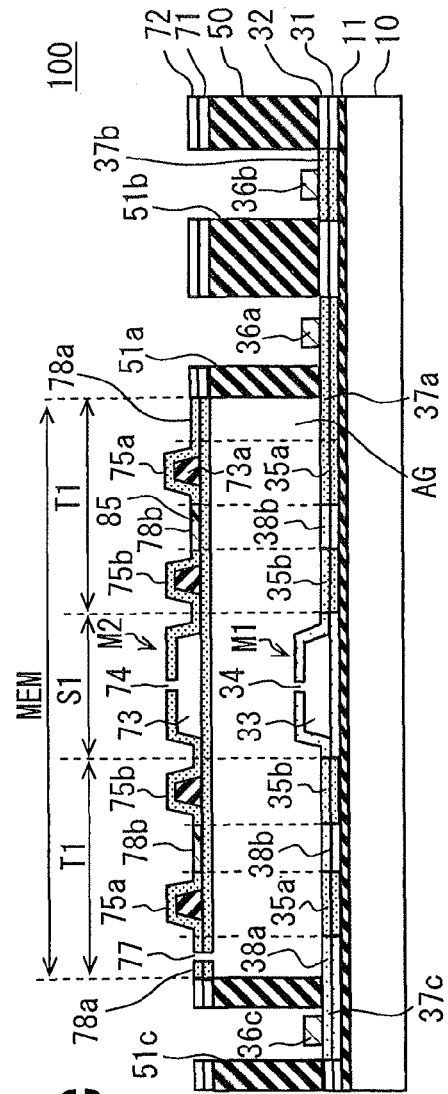
FIG. 16C is a diagram illustrating a cross-sectional view of the Fabry-Perot interferometer according to the sixth embodiment taken along the line XVIC-XVIC in FIGS. 16A and 16B.

Specifically, as shown in FIG. 16C, whereas the outer spring 78a is formed as a stacked layer of the high refractive bottom layer 71 and the high refractive top layer 72, the inner spring 78b is formed as a stacked layer of the high refractive bottom layer 71 and a resin layer 85. The thickness of the outer spring 78a is almost equal to the thickness of the inner spring 78b. For example, the high refractive bottom layer 71 and the high refractive top layer 72 are made of poly-silicon, and the resin layer 85 is made of polyimide. The Young's modulus of poly-silicon (silicon) is about 160 GPa, and the Young's modulus of polyimide is about 10 GPa. Thus, the spring constant k2 of the spring 78b is smaller than the spring constant k1 of the spring 78a.

Further, according to the sixth embodiment, the thickness of the membrane MEM is uniform all over the peripheral region T1. In such an approach, the concentration of local stress on the membrane MEM during displacement of the membrane MEM is reduced so that the membrane MEM can be protected from damage. Thus, the Fabry-Perot interferometer 100 can have a high reliability.

A method of manufacturing the Fabry-Perot interferometer 100 of the sixth embodiment is almost the same as the method of manufacturing the Fabry-Perot interferometer 100 of the second embodiment except that the resin layer 85 is formed on the high refractive bottom layer 71 to form the spring 78b after the high refractive top layer 72 is removed by the lift-off process.

The high refractive bottom layer 71 and the high refractive top layer 72 can be made of a material other than poly-silicon. For example, the high refractive bottom layer 71 and the high refractive top layer 72 can be made of silicon nitride, which has the Young's modulus of about 300 Gpa. The resin layer 85 can be made of a material other than polyimide. For example, the resin layer 85 can be made of silicon dioxide, which has the Young's modulus of about 70 Gpa.

Seventh Embodiment

Figure 17A:
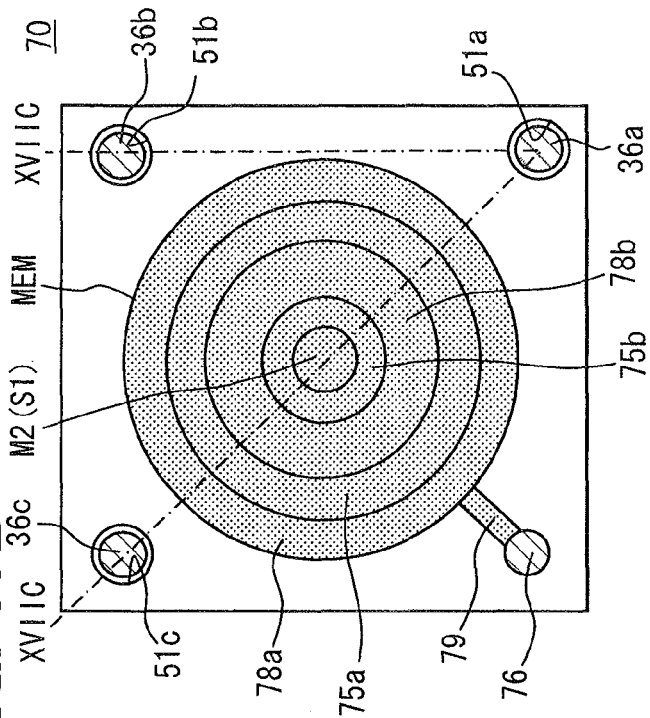
FIG. 17A is a diagram illustrating a plan view of a fixed mirror structure of a Fabry-Perot interferometer according to a seventh embodiment of the present invention.
Figure 17B:
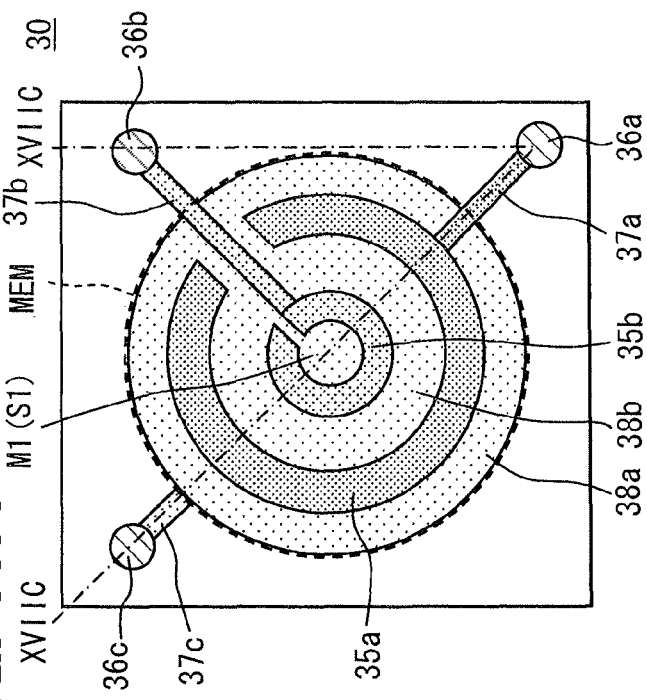
FIG. 17B is a diagram illustrating a plan view of a movable mirror structure of the Fabry-Perot interferometer according to the seventh embodiment.
Figure 17C:
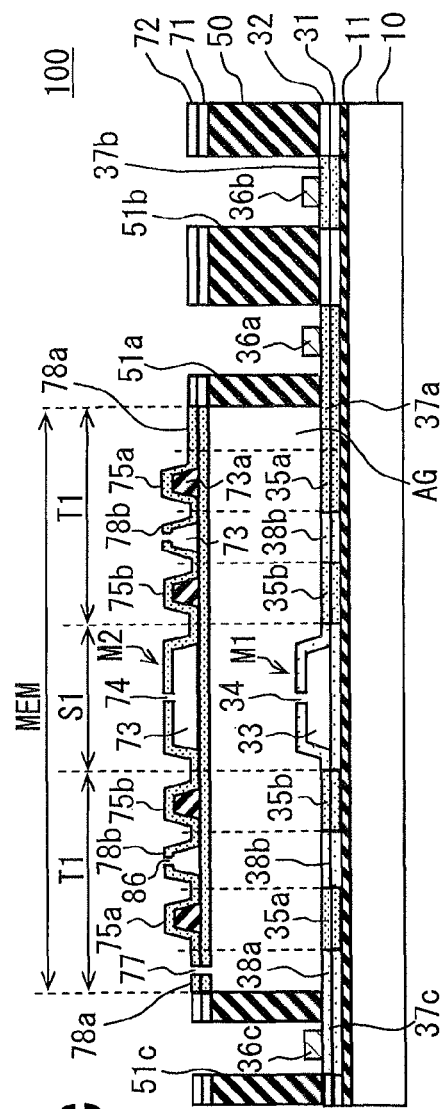
FIG. 17C is a diagram illustrating a cross-sectional view of the Fabry-Perot interferometer according to the seventh embodiment taken along the line XVIIC-XVIIC in FIGS. 17A and 17B.

A Fabry-Perot interferometer 100 according to a seventh embodiment of the present invention is described below with reference to FIGS. 17A-17C. In FIGS. 17A, 17B, the through holes 34, 74, and 77 are omitted for the sake of simplicity. The Fabry-Perot interferometer 100 of the seventh embodiment is similar to the Fabry-Perot interferometer 100 of the second embodiment shown in FIGS. 8A-8C. Differences between the second embodiment and the seventh embodiment are as follows.

According to the seventh embodiment, whereas the outer spring 78a is formed as a stacked layer of the high refractive bottom layer 71 and the high refractive top layer 72, the inner spring 78b is formed as a stacked layer of the high refractive bottom layer 71, the high refractive top layer 72, and the air layer 73 interposed between the high refractive bottom layer 71 and the high refractive top layer 72.

In such an approach, the spring constant k2 of the inner spring 78b can be smaller than the spring constant k1 of the outer spring 78a.

Further, according to the seventh embodiment, impurities are heavily doped into at least one of the high refractive bottom layer 71 and the high refractive top layer 72 of the spring 78b. Thus, the spring 78b is less likely to transmit light so that an aperture can be adjusted by the spring 78b. Therefore, the full width at half maximum (FWHM) of the wavelength of the transmitted light can be small so that the resolution can be improved.

A method of manufacturing the Fabry-Perot interferometer 100 of the seventh embodiment is almost the same as the method of manufacturing the Fabry-Perot interferometer 100 of the second embodiment except that the process of forming the resist 81 and the process of thinning the spring 78a by the lift-off process are not required in the seventh embodiment and that a process of removing the low refractive layer 73a of the spring 78b is required in the seventh embodiment. Specifically, a through hole 86 is formed in the high refractive top layer 72 at the same time when the through hole 74 is formed, and the low refractive layer 73a of the spring 78b is removed by using the through hole 86 at the same time when the low refractive layer 73a of the movable mirror M2 is removed by using the through hole 74.

(Modifications)

The embodiments described above can be modified in various ways, for example, as follows.

In the embodiments, the substrate 10 is a semiconductor substrate with the insulation layer 11. The substrate 10 is not limited to a semiconductor substrate. For example, the substrate 10 can be an insulation substrate such as a glass substrate. In such an approach, the insulation layer 11 can be made unnecessary.

In the embodiments, the air layers 33, 37 are used as low refractive layers of the mirrors M1, M2. The low refractive layers of the mirrors M1, M2 are not limited to an air layer. For example, the low refractive layers of the mirrors M1, M2 can be a solid or liquid layer made of such as a silicon dioxide, a gas layer made of gas other than air, a sol layer, a gel layer, or a vacuum layer In the embodiments, each of the springs 78a, 78b and the electrodes 75a, 75b has a continuous ring-shape or C-shape so that the spectral region S1 can be surrounded with each of the springs 78a, 78b and the electrodes 75a, 75b independently. The shape of each of the springs 78a, 78b and the electrodes 75a, 75b is not limited to a continuous ring-shape or C-shape. For example, at least one of the springs 78a, 78b and the electrodes 75a, 75b can have separate portions, and the separate portions can be arranged at an interval around the spectral region S1. If the electrodes 75a, 75b have such separate portions, a connection member, such as a wire, for electrically connecting the separate portions is needed.

In the embodiments, multiple electrode pairs are electrically isolated from each other to apply a voltage to each electrode pair independently. In such an approach, voltages applied to the electrode pairs can be different from each other so that electrostatic forces generated in the electrode pairs can be different from each other. It is noted that the electrostatic force generated in the electrode pair is proportional to the overlapping area of the electrode pair. Therefore, in instead of differentiating the voltages applied to the electrode pairs from each other, the overlapping areas of the electrode pairs can be differentiated from each other. In such an approach, the electrostatic forces generated in the electrode pairs can be different from each other even by applying the same voltage to the electrode pairs. In this case, since there is no need to electrically isolate the electrode pairs from each other, the wiring can be simplified. In addition to differentiating the voltages applied to the electrode pairs from each other, the overlapping areas of the electrode pairs can be differentiated from each other.

In the embodiments, the movable mirror structure 70 is supported above the fixed mirror structure 30 by the supporting member 50. Alternatively, a portion of the movable mirror structure 70 outside the membrane MEM can be in contact with the fixed mirror structure 30 so that the movable mirror structure 70 can be supported above the fixed mirror structure 30 by the portion. In such an approach, the supporting member 50 can be made unnecessary. In this case, a sacrifice layer is formed on only a portion of the high refractive top layer 32 located opposite to the membrane MEM in the manufacturing process. Then, the movable mirror structure 70 is formed so that the sacrifice layer can be covered with the movable mirror structure 70. Then, the sacrifice layer is completely removed by etching to form the air gap AG.

Such changes and modifications are to be understood as being within the scope of the present invention as defined by the appended claims.

What is claimed is:

1. A Fabry-Perot interferometer comprising:
   a fixed mirror structure having a fixed mirror in a spectral region; and
   a movable mirror structure including a movable membrane oppositely spaced from the fixed mirror structure, the membrane having a movable mirror in the spectral region, wherein
   the membrane has a plurality of springs in a peripheral region outside the spectral region, the plurality of springs being arranged one inside the other around the spectral region,
   one of the fixed mirror structure and the membrane has a plurality of first electrodes in the peripheral region,
   the other of the fixed mirror structure and the membrane has at least one second electrode in the peripheral region,
   the plurality of first electrodes and the at least one second electrode are located opposite to each other to form a plurality of opposing electrode pairs arranged one inside the other around the spectral region,
   a number of the plurality of springs is equal to a number of the plurality of opposing electrode pairs,
   the plurality of springs has a first spring and a second spring located closer to a center of the membrane than the first spring in a direction from an outer edge of the membrane to the center of the membrane,
   a spring constant of the second spring is less than a spring constant of the first spring,
   the plurality of opposing electrode pairs has a first electrode pair and a second electrode pair,
   a first voltage is applied to the first electrode pair during a first period to generate a first electrostatic force,
   a second voltage is applied to the second electrode pair during a second period to generate a second electrostatic force, and
   the first period overlaps the second period so that the membrane is displaced during the overlapping period by both the first electrostatic force and the second electrostatic force.

2. The Fabry-Perot interferometer according to claim 1, wherein
   one of the plurality of springs is located closer to the outer edge of the membrane than any one of the plurality of opposing electrode pairs, the plurality of springs and the plurality of opposing electrode pairs are alternately arranged in the direction from the outer edge of the membrane to the center of the membrane, when the membrane has the plurality of first electrodes, a stiffness of each of the plurality of first electrodes is greater than a stiffness of any one of the plurality of springs, and when the membrane has the at least one second electrode, a stiffness of the at least one second electrode is greater than the stiffness of any one of the plurality of springs.

3. The Fabry-Perot interferometer according to claim 2, wherein
the second electrode pair is located inside the first electrode pair,
the first spring is deformed by the first electrostatic force generated by the first electrode pair upon application of the first voltage, and
the second spring is mainly deformed by the second electrostatic force generated by the second electrode pair upon application of the second voltage.

4. The Fabry-Perot interferometer according to claim 2, wherein
the spring constant of the first spring is seven or more times greater than the spring constant of the second spring.

5. The Fabry-Perot interferometer according to claim 1, wherein
the membrane has a plurality of first electrodes, and
each of the plurality of first electrodes serves as a corresponding one of the plurality of springs.

6. The Fabry-Perot interferometer according to claim 1, wherein
the membrane defines through holes that cause the plurality of springs to have a beam structure, and
the plurality of springs differs from each other in at least one of a number of beams included in the beam structure, a length of each beam in a direction from the outer edge of the membrane to the center of the membrane, and a width of each beam, in such a manner that the spring constant of the second spring is smaller than the spring constant of the first spring.

7. The Fabry-Perot interferometer according to claim 1, wherein
the plurality of springs has a through hole, and
the plurality of springs differs from each other in at least one of a size and a density of the through hole in such a manner that the spring constant of the second spring is smaller than the spring constant of the first spring.

8. The Fabry-Perot interferometer according to claim 1, wherein
the plurality of springs has an impurity doped portion, and
the plurality of springs differs from each other in a concentration of the impurity doped portion in such a manner that the spring constant of the second spring is smaller than the spring constant of the first spring.

9. The Fabry-Perot interferometer according to claim 1, wherein
the plurality of springs has a different thickness in such a manner that the spring constant of the second spring is smaller than the spring constant of the first spring.

10. The Fabry-Perot interferometer according to claim 1, wherein
the plurality of springs has a different Young's modulus in such a manner that the spring constant of the second spring is smaller than the spring constant of the first spring.

11. The Fabry-Perot interferometer according to claim 1, wherein
the first spring has a two layer structure including a first layer and a second layer on the first layer,
the second spring has a three layer structure including a third layer, a fourth layer on the third layer, and a fifth layer on the fourth layer,
each of the first layer, the second layer, the third layer, and the fifth layer is a semiconductor thin layer made of at least one of silicon and germanium,
the fourth layer is an air layer, and
a refractive index of the fourth layer is less than a refractive index of any one of the first layer, the second layer, the third layer, and the fifth layer.

12. The Fabry-Perot interferometer according to claim 11, wherein
at least one of the third layer and the fifth layer of the second spring has an impurity doped portion.

13. The Fabry-Perot interferometer according to claim 1, wherein
the fixed mirror structure is located on a substrate,
each of the fixed mirror and the movable mirror has a first layer, a second layer on the first layer, and a third layer on the second layer,
each of the first layer and the third layer is a semiconductor thin layer made of at least one of silicon and germanium,
a refractive index of the second layer is less than a refractive index of any one of the first layer and the third layer,
each electrode of the plurality of opposing electrode pairs of the fixed mirror structure has a stacked layer of the first layer and the third layer, and
the stacked layer has an impurity doped portion.

14. The Fabry-Perot interferometer according to claim 13, wherein
the plurality of opposing electrode pairs is electrically isolated from each other.

15. The Fabry-Perot interferometer according to claim 14, wherein
the plurality of first electrodes is electrically isolated from each other by a PN junction.

16. The Fabry-Perot interferometer according to claim 14, wherein
the plurality of first electrodes is electrically isolated from each other by a trench.

17. The Fabry-Perot interferometer according to claim 14, wherein
the fixed mirror structure has the plurality of first electrodes,
the membrane has one second electrode, and
the plurality of first electrodes is electrically isolated from each other.

18. The Fabry-Perot interferometer according to claim 13, wherein
the plurality of opposing electrode pairs has a different opposing area.

19. The Fabry-Perot interferometer according to claim 13, wherein
the second layer is an air layer.

20. The Fabry-Perot interferometer according to claim 13, wherein
each electrode in the membrane has a fourth layer located between the first layer and the third layer,
a refractive index of the fourth layer is less than the refractive index of any one of the first layer and the third layer, and
the fourth layer is solid.

* * * * *